US012327495B2

(12) United States Patent
Warne

(10) Patent No.: US 12,327,495 B2
(45) Date of Patent: Jun. 10, 2025

(54) MOTION SYSTEM

(71) Applicant: Dynisma Ltd., Bristol (GB)

(72) Inventor: Ashley William Hawker Warne, Bristol (GB)

(73) Assignee: Dynisma Ltd., Bristol (GB)

( * ) Notice: Subject to any disclaimer, the term of this patent is extended or adjusted under 35 U.S.C. 154(b) by 823 days.

(21) Appl. No.: 17/439,071

(22) PCT Filed: Apr. 27, 2020

(86) PCT No.: PCT/EP2020/025194
§ 371 (c)(1),
(2) Date: Sep. 14, 2021

(87) PCT Pub. No.: WO2020/216476
PCT Pub. Date: Oct. 29, 2020

(65) Prior Publication Data
US 2022/0180765 A1   Jun. 9, 2022

(30) Foreign Application Priority Data
Apr. 26, 2019  (EP) .................................. 19020316

(51) Int. Cl.
*G09B 9/042*  (2006.01)
*G09B 9/05*  (2006.01)
(52) U.S. Cl.
CPC ............... *G09B 9/042* (2013.01); *G09B 9/05* (2013.01)
(58) Field of Classification Search
CPC ........................................................ G09B 9/05
See application file for complete search history.

(56) References Cited

U.S. PATENT DOCUMENTS 5,567,157 A * 10/1996 Salmon, Jr. ............. G09B 9/12
434/29
5,919,045 A    7/1999 Tagge et al.
(Continued)

FOREIGN PATENT DOCUMENTS

EP    2810268 B1   3/2017
FR    2677155 A1   5/1991
(Continued)

OTHER PUBLICATIONS

Park, Sang A., et al. Multi-Degree of Freedom Platform Based on Spherical Wheels, Jul. 7, 2015, 2015 IEEE International Conference on Advanced Intelligent Mechatronics (AIM), pp. 1061-1065. (Year: 2015).*

(Continued)

*Primary Examiner* — Jay Trent Liddle
*Assistant Examiner* — Alyssa N Brandley
(74) *Attorney, Agent, or Firm* — Alston & Bird LLP

(57) ABSTRACT

This invention relates to the field of motion systems especially for simulating motion such as driving or flying. In particular, though not exclusively, the invention relates to motion generators, and to systems including such motion generators, and to methods of using motion generators and motion systems for example as vehicle simulators. One aspect of the invention relates to a primary motion generator (10,82,102) for use in a motion simulator for moving a primary payload (14) of 80 kg or more above a surface (12), the primary motion generator (10,82,102) being a parallel manipulator comprising: a primary frame or platform (11) for supporting the primary payload of 80 kg or more (14), three elongate linear guides (21,22,23) arranged transversely to each other below the frame in a planar array, at least one actuator (31,32,33) arranged per linear guide (21,22,23) above the surface, and controllable to move the linear guides (Continued)

(21,22,23) whereby the primary payload of 80 kg or more is movable in at least three degrees of freedom.

20 Claims, 34 Drawing Sheets

(56) References Cited

U.S. PATENT DOCUMENTS

| 2015/0323415 | A1* | 11/2015 | In ....................... | F16M 11/2085 |
| | | | | 73/11.04 |
| 2015/0354747 | A1* | 12/2015 | Jennings ................ | F16M 11/18 |
| | | | | 74/99 R |
| 2016/0140862 | A1 | 5/2016 | Van Lookeren Campagne | |
| 2017/0053548 | A1 | 2/2017 | Warne | |
| 2019/0024842 | A1 | 1/2019 | Durand | |

FOREIGN PATENT DOCUMENTS

| GB | 2474279 A | 4/2011 |
| JP | H 06348197 A | 12/1994 |
| JP | 2001027579 A | 1/2001 |
| WO | WO-2017/021323 A1 | 7/2016 |

OTHER PUBLICATIONS

Venkatesan, Vinoth, et al. Inverse Kinematic Solution of a 6-DOF (3-RPRS) Parallel Spatial Manipulator, Jun. 30-Jul. 3, 2014, The 3rd Joint International Conference on Multibody System Dynamics, The 7th Asian Conference on Multibody Dynamics. (Year: 2014).*
Office Action for Japanese Application No. 2021-563691, dated Dec. 13, 2023, 3 pages.
International Searching Authority, International Search Report and Written Opinion for International Application No. PCT/EP2020/025194, dated Jun. 16, 2020, (9 pages), European Patent Office, Rijswijk, Netherlands.

* cited by examiner

MOTION SYSTEM

CROSS REFERENCE TO RELATED APPLICATIONS

This application is a National Stage Application, filed under 35 U.S.C. § 371, of International Application No. PCT/EP2020/025194, filed Apr. 27, 2020, which claims priority to and the benefit of European Application No. 19020316.6, filed Apr. 26, 2019; the contents of both of which as are hereby incorporated by reference in their entireties.

BACKGROUND

Related Field

This invention relates to the field of motion systems especially for simulating motion such as driving or flying. In particular, though not exclusively, the invention relates to motion generators, and to motion systems including such motion generators, and to methods of using motion generators or motion systems, for example, as vehicle simulators.

Description of Related Art

A motion generator is a device capable of applying movements, forces and accelerations to a payload in one or more directions of degrees of freedom (or "DOF"). The payload can be, for example, a human undergoing a simulated experience in a motion simulator. Alternatively, the payload may also be a further motion generator which is said to be in series with the first. Motion generators are used in motion systems under the control of a control system.

Motion generators are used in a variety of applications, including motion simulation (for example, flight simulators, driving or vehicle simulators), robotics, 3D printing, vibration and seismic simulation. The most common type of motion system currently used in motion simulation is the Stewart platform (or "hexapod"). This is a type of parallel manipulator that has six actuators, normally attached in pairs to three positions on the baseplate of a platform and crossing over to three mounting points on a platform, top plate (or end effector). Devices or payloads such as a human user placed on the platform, usually in some form of cockpit, driver area or model vehicle, can be moved in the six degrees of freedom in which it is possible for a freely-suspended body to move, i.e. the three linear movements x, y, z (lateral, longitudinal, and vertical), and the three rotations (pitch, roll and yaw). Generally speaking, in a parallel manipulator, several computer-controlled actuators are arranged to operate in parallel to support the payload. In this context "parallel" means that only one actuator exists in each separate load path between the payload and the base, whereas in a series manipulator, one or more of the possible load paths between the payload and the base includes at least two actuators.

A motion simulator is a mechanism incorporating at least one motion generator that can create, for an occupant, the effects or feelings of being in a moving vehicle. Motion simulators are used, professionally, for training drivers and pilots in the form of driving simulators and flight simulators respectively. They also are used in the form of vehicle simulators, industrially, in the creation, design, and testing of the vehicles themselves. Professional motion simulators used for driving and flying simulators typically synchronise a visual display—provided for example by a projection system and associated screens and audio signals with the movement of a carriage (or chassis) occupied by the driver or pilot in order to provide a better sensation of the effect of moving. The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience. The payload of a motion generator used in motion simulation—for example a chassis or cockpit—is therefore relatively heavy often being of the order of 100's of kg. Motion simulation applications for motion generators require the precise control of such relatively heavy payloads over significant movements, often being of the order of 1 metre or more.

The type of hexapods typically used for motion simulation for human participants typically have a relatively low bandwidth of up to about 20 Hz. This means that they can create oscillatory movements and vibrations of a consistent amplitude, with a frequency of up to 20 times per second, beyond which the amplitude of the movements reduces as the frequency increases. This is sufficient for replicating most car suspension movements, but it does not transmit the frequency content associated with vibrations from the car engine, tyre vibrations, road noise, and the sharp-edged kerbs on racetracks. A low bandwidth also means the signals are delayed, meaning that the driver cannot respond as quickly.

Current motion systems, especially those intended for high-end use such as in military and commercial flight instruction and training applications, are typically very large, heavy, complex, and very expensive. Their complexity necessitates extensive programming and maintenance, further extending the cost to users.

Dedicated driving simulator motion systems have been developed by the likes of McLaren/MTS Williams/ABD and Ansible, but these tend to be extremely mechanically complex, and therefore expensive, featuring precision machined custom components and often expensive linear motors. These dedicated driving simulator motion systems are more responsive than hexapods when moving in some directions but are still limited in others. The use of ball screws in such systems is disadvantageous in that, whilst good at establishing position, they inhibit force transfer and can only achieve a lower bandwidth. This results in a less natural experience for a human user.

U.S. Pat. No. 5,919,045 discloses an interactive racing car simulator, including a primary motion generator comprising a simple arrangement of overlaying rectangular frames arranged to move in the X and Y directions respectively on linear guides, under pneumatic control, and termed the "X and Y frames". Whilst the simple arrangement of X and Y frames of the type disclosed in this document provide good excursions in the X and Y directions, as the X and Y frames are stacked above each other in the motion generator is not compact in the vertical dimension. Furthermore, the movements in the X and Y directions are not especially precise, and also has a relatively low bandwidth. It is not a parallel manipulator-type arrangement. Another X and Y frame arrangement is disclosed in GB2474279A. A further X and Y arrangement is disclosed in FR2677155A.

In all of the above prior art motion generator arrangements, the X and Y axes are arranged in series with each other. Assuming that the X axis is attached to ground, this mean that forces associated with movements in the Y axis need to be transmitted via the X axis to ground. This indirect load path inevitably introduces compliance, therefore reducing the responsiveness and bandwidth of known motion generators.

One example of a primary motion generator having a payload comprising a further motion generator is given in EP2810268A which discloses a three degree of freedom motion generator in series with a six degrees of freedom motion generator which can sustain large movements in the horizontal plane using the primary motion generator, while simultaneously achieve the maximum vertical travel of the secondary motion generator. Therefore, the two motion generators in series can achieve combinations of movements in different degrees of freedom which are impossible with a similarly sized hexapod. However, in order to achieve this, it uses an extremely large, heavy and complex planar bearing system relying on a precision-machined metal base and magnetically preloaded air bearings. This requires extensive building work to incorporate the driving simulator into any building and is difficult and is time consuming to set up to ensure planarity. The metal base is expensive as it has a large surface area which must be precision machined to ensure flatness. The air bearing units are complex requiring an air supply, and they require a fail-safe mechanism to prevent the permanent magnets from becoming permanently bonded to the metal base.

US 2017/0053548 A discloses a motion system including a cable/actuator-controlled platform which is slidable on a large low friction fixed base, and which allows for significant horizontal movement of the platform. The cables and actuators are disposed around the periphery of the large base, allowing the significant horizontal movement of the platform. A hexapod-based secondary motion generator is in turn mounted on the platform and supports a model cockpit in order to provide further movement of the cockpit. The system is not compact and has poor bandwidth.

WO 2017/021323, from the same applicant as EP2810268A, discloses a further cable-controlled motion generator. The cables in this motion generator are moved by an arrangement of large pulleys to move a central effector. The high inertia of the pulleys inhibits high bandwidth operation. This system requires a large, expensive and complex planar bearing surface whereas a motion generator of the present invention has its load bearing capability built into its own mechanism.

An object of the present invention is to provide an improved motion generator, and improved motion systems, and other implementations such as motion simulators incorporating such motion generators.

BRIEF SUMMARY

According to one aspect of the invention, there is provided a primary motion generator suitable for use in, or in, a motion simulator and capable of moving a primary payload of 80 kg or more above a surface, the primary motion generator being a parallel manipulator comprising: a) a primary frame or platform for supporting the primary payload of 80 kg or more (14), b) three elongate linear guides arranged transversely to each other below the frame in a planar array, and c) at least one actuator arranged per linear guide above the surface, and controllable to move the linear guides whereby the primary payload of 80 kg or more is movable in at least three degrees of freedom.

A primary motion generator in accordance with the invention provides movement in three degrees of freedom. A primary motion generator in accordance with the invention may be stiffer, or less compliant, than known motion generators, especially those based on an arrangement of X and Y frames as mentioned above. A primary motion generator in accordance with the invention may provide relatively large movements in the longitudinal/surge, lateral/sway and yaw directions. For example, a motion generator in accordance with the invention may have a minimum excursion radius of about 0.5 metre, i.e. its platform may be able to move about 0.5 metre in the X and Y directions simultaneously. For example, the motion generator in accordance with the invention may have a minimum excursion radius of 0.49 to 0.6 metre. A preferred motion generator in accordance with the invention may have minimum excursion radius of 0.5 to about 1 metre or more, preferably 1.5 metres or more. A motion generator in accordance with the invention is therefore well suited to land vehicle/driving simulation because it has reasonably large travel in surge, sway and yaw motions, while the heave, pitch and roll degrees of freedom can be provided by a more modest secondary motion generator system connected in series with the primary motion generator in a motion system. This allows a motion system of the invention to be far more vertically compact than hexapod-based motion generator systems, which facilitates easier installation, accommodation and access. The driver's or pilot's position on a typical hexapod-based motion generator for a driving simulator would be over a metre from the ground, whereas with a motion system according to the invention, it could be less than half a metre. Being a 6 DOF parallel manipulator, a hexapod's excursion capabilities are highly coupled in each degree of freedom. For example, if it goes to a fully forward longitudinal position, then it cannot generate a heave movement without also introducing other undesired movements. Such other undesired movements may be avoided in a primary motion generator or a combination in accordance with the invention as discussed below. Although described as a "primary" motion generator, a primary motion generator of the invention may, in certain applications, be used in series with another motion generator, possibly of the same design, which thus becomes a secondary motion generator.

In the context of the present invention, the payload of the primary motion generator is typically greater than 80 kg. The primary payload may include a human user, or vehicle or model of all or part of a vehicle. Thus, the payload may typically be more than about 80 kg, or more than about 250 kg, or more than about 500 kg, or more than about 2 tons (for example in the form of a fill vehicle chassis).

The elongate linear guides may form a star-shaped array, such as three-pointed star array, or otherwise extend radially, and/or extend outwardly from a common central point. Normally each guide would be angle at 120 degrees from another guide as this is likely to be optimal in most cases, but this is not a requirement.

A motion generator according to any preceding claim in which the linear guides are parallel with a common base plane. At least two of the linear guides, preferably three of the linear guides may abut, or be joined, with each other. The linear actuators may be linear motor, rack and pinion, belt drive belt, cable drive, or ball screw-based. There may be more than three linear actuators. For example, there may be six linear actuators. The linear actuators may be arranged in a generally triangular array. Preferably the linear actuators are arranged in a planar array. The linear actuators may move the primary frame by applying propulsive forces to carriages that connect the linear actuators to the linear guides and are movable along the linear guides, the propulsive forces thereby being transmitted from the actuators to the primary frame via the carriages and linear guides by applying forces which include a component that is normal i.e. perpendicular to the axis of movement of the linear guide, in such a way that forces applied at one linear guide are transmitted through the primary frame and cause other linear guides to travel along their axis of movement. A linear actuator may be connected to a corresponding linear guide's carriage by a joint, bearing, revolute joint, spherical joint or thrust bearing Preferably, the or each linear actuator is connected to the corresponding carriage associated with a linear guide by a spherical joint. Hexapods and other motion generators typically generate motion by use of ball screw actuators which inherently have a lot of friction within them. This friction manifests itself as a step force input to the system when the system passes through zero speed. Such disturbances limit the bandwidth to which such systems can be controlled. Accordingly, the primary motion generator of the invention is advantageous over such ball screw-based motion generators. All or several of the linear actuators may be mounted on a surface.

A motion generator of the invention may be advantageous in that it inherently has low friction in its moving parts, namely its linear guides, actuators (provided they are not of the ball screw type), and joints.

In contrast with the system of, for example, EP2810268, the primary motion generator of the invention dispenses with the requirement for a complex planar air bearing arrangement in favor of a series of linear bearings which are readily commercially available, inexpensive components. Furthermore, the system of EP2810268 referred to above also has separate bearing and drive mechanisms, whereas in the primary motion generator of the invention, the bearing and drive mechanisms are combined, thereby simplifying the system and reducing cost further.

The primary motion generator of the invention is suitable for a wide range of actuator technologies in addition to ball screw actuators, which allow the motion system to be controlled to a higher bandwidth and lower latency. Such actuator technologies include linear motors and belt drives.

The actuator technologies which may be used in the present invention also enable the motion system to be back-drivable, which can have useful applications in entertainment and training scenarios whereby the user may move their body or apply forces to the primary and/or motion generator as the case may be in order to provide an input to the simulation experience. For example, in a skiing simulation using a primary motion generator of the invention in a motion system the movement of the user's body would apply forces to a motion generator platform which would change its position, velocity and or acceleration which could be measured by the control system, and used as an input relating to the position of the skis which will then affect the skiing simulation in the virtual environment. Thus, the platform may represent for example a ski, surfboard, or skateboard. The primary motion generator may include at least one safety end stop to limit travel of the frame or platform comprising one or more elongate straps between the platform or frame and the surface which limits movement of the fame or platform. Preferably there are three or more straps for limiting movement of the frame. At least one, preferably all straps, is/are rigidly fixed at one end and at the other end are connected in series with a shock absorber, spring or damper.

According to another aspect of the invention, there is provided a combination comprising a motion generator according to the first aspect of the invention as a primary motion generator, and a secondary motion generator mounted on the primary motion generator, as the primary motion generator's payload. Preferably the combination is used as the basis for a motion system.

The primary motion generator may be used in series with a secondary motion generator which provides additional degrees of freedom in the vertical/heave, roll and pitch directions.

Whilst a primary motion generator of the invention typically has a higher bandwidth than conventional primary motion generators such as those described for example in U.S. Pat. No. 5,919,045 or US2017/0053548A, when it is used in series with a secondary motion generator it will typically have a lower bandwidth than the secondary motion generator because it must also move a relatively heavy primary frame. Therefore, having a 6 DOF secondary motion generator is advantageous because it enables higher bandwidth motion in the horizontal degrees of freedom and provide vertical movement capabilities through the additional degrees of freedom. A combination according to the invention, in use, the primary motion generator may operate at a lower bandwidth than that of the secondary motion generator. For example, the primary motion generator may be operated at from about 5 Hz about 20 Hz, and the secondary motion generator may be operated at from about 30 Hz to 100 Hz or greater.

Therefore, a motion system for use for example as a high-performance driving simulator would have a 6 DOF secondary motion generator, whilst a more affordable entertainment focused motion-based system might comprise a 3 DOF secondary motion generator.

A motion system according to the invention may comprise a primary motion generator according the invention, and a secondary motion generator in series forming a combination which is under the control of control means i.e. a control system. Consequently, the motion system can create its full range of vertical motion regardless of the horizontal orientation. Furthermore, the primary motion generator can access a greater part of its radial operating envelope at different yaw angles than can a hexapod platform. This is highly useful in land vehicle simulation because a vehicle is often experiencing high lateral or longitudinal acceleration at the same time as yaw acceleration. Therefore, it is advantageous to be able to generate lateral or longitudinal accelerations which require lateral or longitudinal movement of the primary motion generator at the same time as yaw accelerations which require yaw movement.

Preferably, the secondary motion generator used in combination with a primary motion generator in a combination in accordance with the invention will have three or more degrees of freedom i.e. three, four, five or six or more degrees of freedom. In one embodiment the secondary motion generator has six degrees of freedom, giving the required additional three degrees of freedom (heave, pitch and roll) while also providing three redundant degrees of freedom (surge, sway and yaw, already provided by the primary motion generator) In some situations, this redundancy may be useful. For example, it may make it possible to increase the range of movements generated by the primary motion generator. Also, it may make it possible to provide greater bandwidth in the redundant degrees of freedom than the primary motion generator is able to. The primary motion generator of the invention when used in series with a secondary motion generator is highly suited to the simulation of land vehicles and superior to ball screw hexapods in these applications for some or all of the following reasons. First, it may be more compact operating within a workspace optimized for land vehicle simulation Second, in operation, it has less undesirable cross-coupling between degrees of freedom i.e. it reduces the undesired limits on movements in one direction (e.g. yaw) when the system is already extended in another direction (e.g. sway) referred to above which may be associated with a hexapod-based motion system. Third, it has higher bandwidth, and lower latency than conventional comparable motion generators and may be back-drivable.

According to another aspect of the invention there is provided a vehicle simulator comprising a primary motion generator according to the invention or a combination including such a motion generator, a motion system according to the invention, or a motion system according to the invention, and a cockpit or chassis and/or other vehicle simulation element. The vehicle simulator may include means for simulating an environment comprising at least one of display apparatus, virtual reality apparatus, projection apparatus, and software means for modelling a virtual environment and a vehicle model.

In further aspects of the invention there are provided a method of producing a motion generator or combination in accordance with the invention, or a method of vehicle or vehicle component design, either method including the use of a motion generator according to the invention, a combination according to the invention, or a vehicle simulator according to the invention. Further aspects of the invention are set out in the claims and description below and include a game apparatus.

BRIEF DESCRIPTION OF THE FIGURES

Motion generators, motion systems, and driving simulators and their operation and production in accordance with the invention will now be described, by way of example only, with reference to the accompanying drawings, FIGS. 1 to 37, in which.

DETAILED DESCRIPTION OF VARIOUS EMBODIMENTS

Embodiments comprising or consisting of motion generators, motion systems, and vehicle/driving simulators in accordance with the invention, and methods for their use and production will now be described by way of example only. The skilled addressee will appreciate that many further embodiments may be realised within the scope of the invention.

Primary Motion Generator

Figure 1:
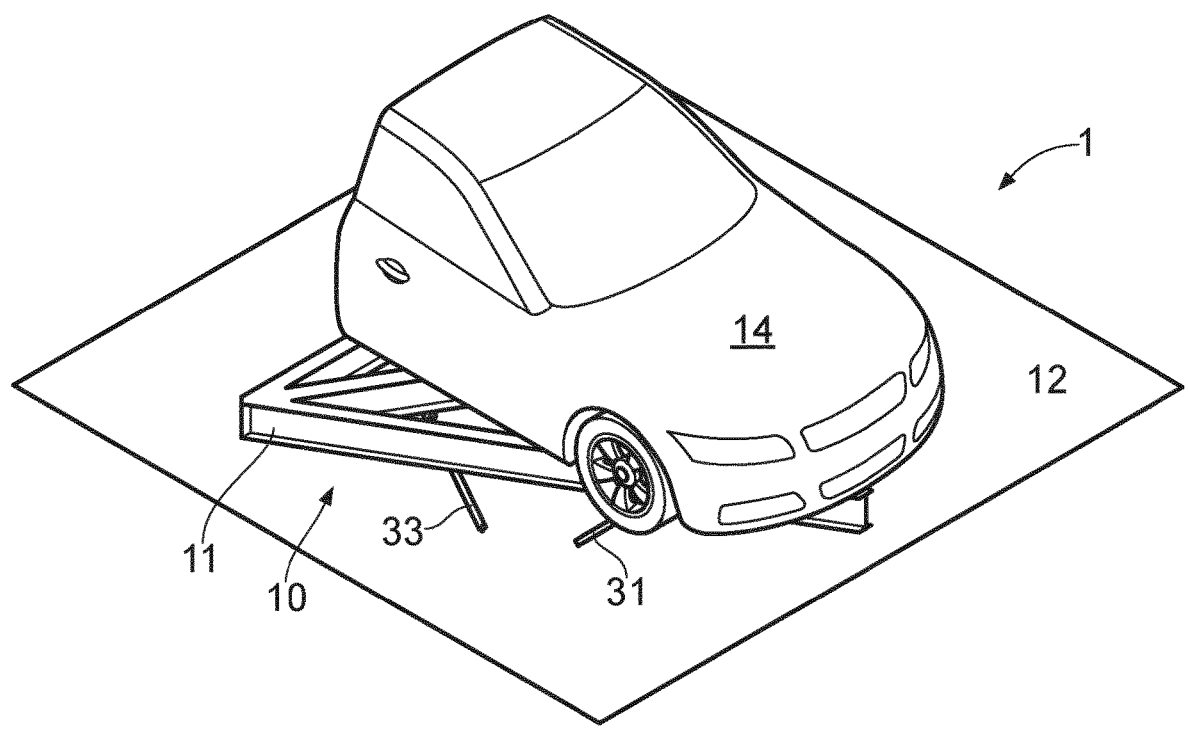
FIG. 1 is a perspective view of a motion system incorporating a primary motion according to the invention with a base.

The motion system 1 shown in FIG. 1 includes a primary motion generator 10 in accordance with a first aspect of the invention. The motion generator 10 comprises a support frame 1 1 which is arranged for movement above a surface 12. The surface 12 is generally flat.

The frame 11 is constructed from a lightweight material, such as aluminium or carbon fibre, and describes a triangular perimeter in the embodiment shown. Other frame shapes, such as rectangular, or circular, are also possible. The frame 11 supports a chassis 14 replicating, in this case, a portion of a passenger car. The chassis 14, constitutes the payload of the motion generator and weighs approximately 1000 kg, plus any user. Other types of chassis known to the skilled person may be used. For example, a saloon body chassis optimised for use in a simulator would weigh around 500 kg. A full car would weigh about 2 tonnes. A racing car chassis, being typically made of carbon fibre, would weigh as little as 250 kg including the driver. Movement of the frame 1 1 is provided through the interaction of elongate linear guides 21, 22, 23 which are arranged in a three pointed star arrangement below the frame 1 1 (as shown particularly in FIG. 2), linear actuators 31, 32, 33 mounted on the surface 12, and respective linear actuator carriages 41, 42, 43, on which the frame 1 1 is mounted. The linear actuator carriages 41, 42, 43 are driven by the linear actuators 31, 32, 33 respectively. The linear guides 21, 22 and 23, which are mounted in a common base plane, are accurately formed from metal such as aluminium, steel et cetera. The linear actuators 31, 32, 33 in this embodiment are belt drive units but could, alternatively, be for example linear motor or ball screw-driven actuators.

The carriages 41, 42, 43 are arranged to move in either linear direction driven by the respective linear actuators 31, 32, and 33 under instructions from a primary motion generator control system (shown in FIG. 37 and described in more detail below). Each carriage 41, 42, 43 includes an upper carriage component or bearing race (41U, 42U, and 43U respectively) which engages an associated linear guide 21, 22 and 23, connected by a revolute joint to a lower carriage component or bearing race (41L, 42L, 43L respectively) fixed with the connected linear actuator 31, 32 or 33 respectively. For example, as shown in FIG. 3A, carriage 41 includes an upper carriage component 41U and a lower carriage component 41L interconnected by a revolute joint 41 RJ having an axis perpendicular to the common base plane. The revolute joint could be replaced with a self-aligning or spherical bearing to accommodate any small lack of planarity in the three linear guides or three actuators.

The surface 12 may be the floor of a building in which the motion generator 10 is located or could be a specific support surface member, mounted on such a floor. As noted above the primary motion generator of the invention is advantageous in that it does not require a precision machined metal floor surface as required for some prior art motion generators.

Figure 2:
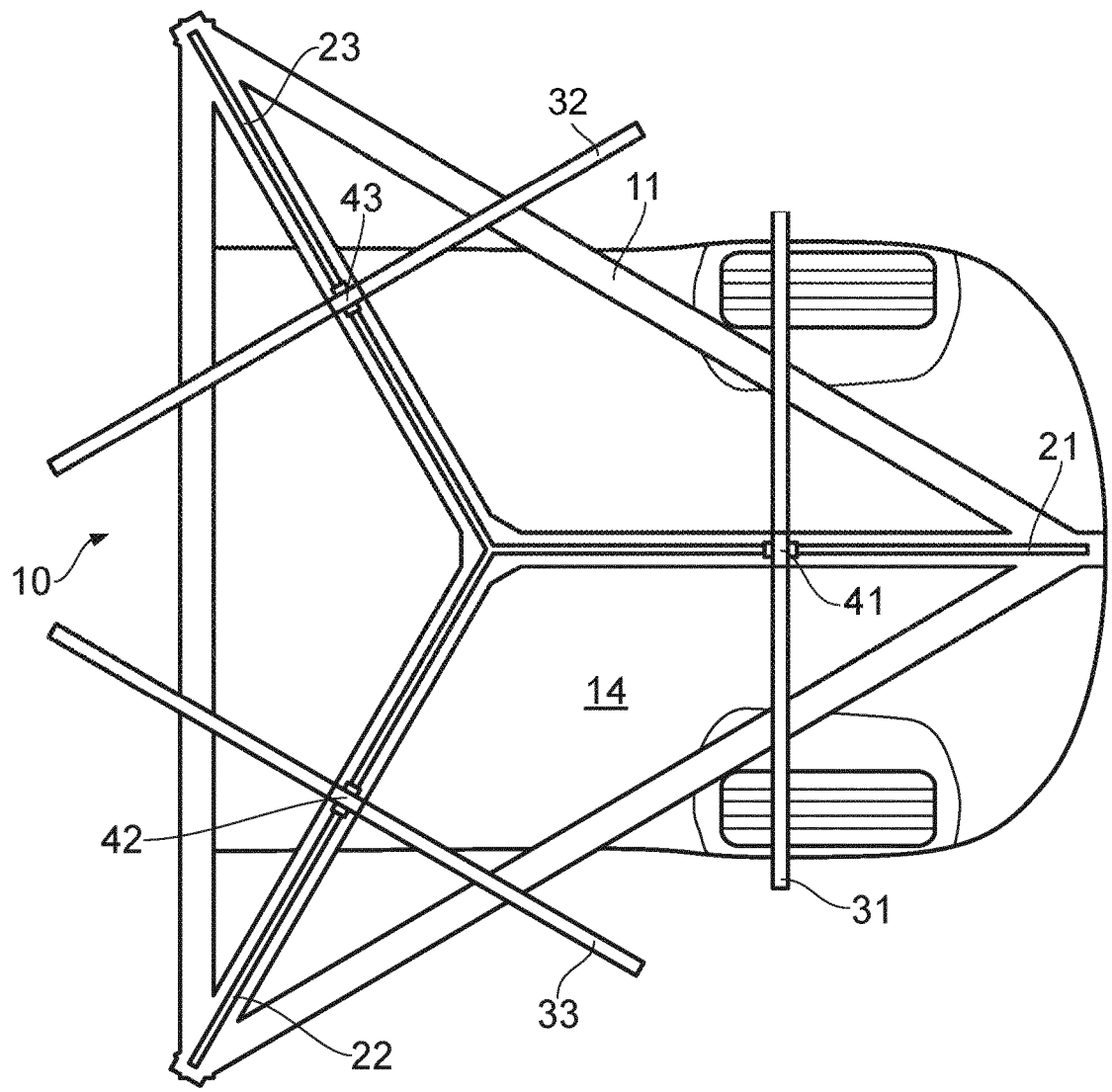
FIG. 2 is a plan view from below of the motion system of FIG. 1 without a base in a neutral condition.
Figure 3:
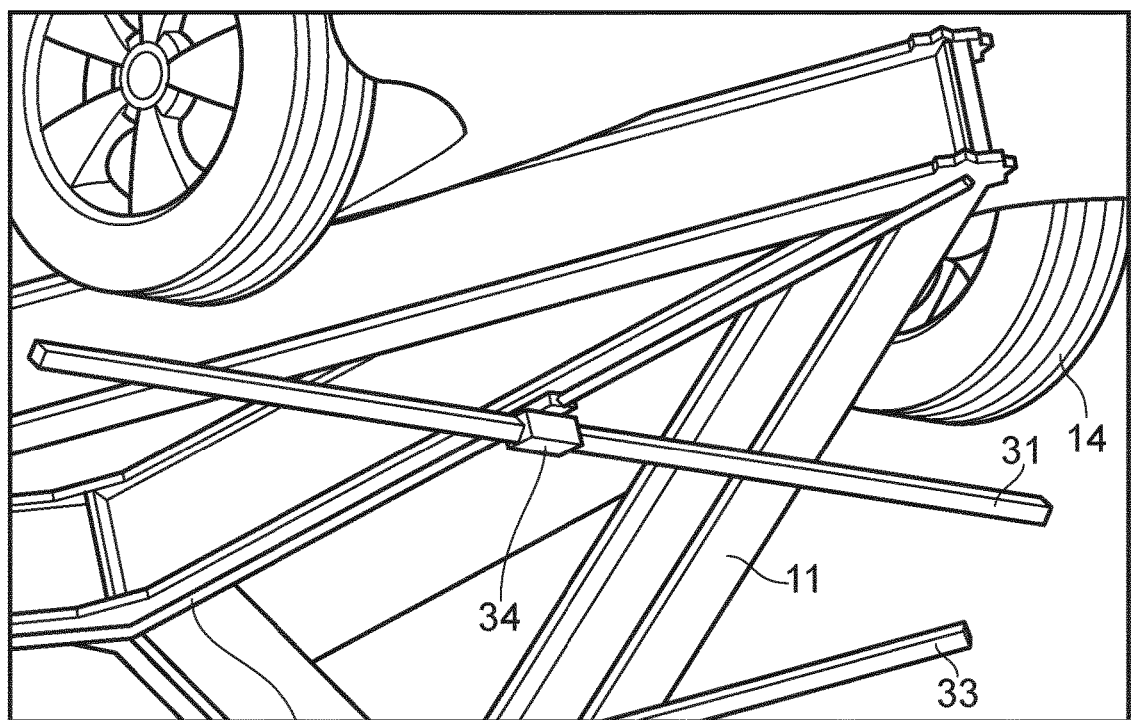
FIG. 3 is a detail schematic view of the motion system of FIG. 1 without the base showing the primary motion generator.
Figure 3A:
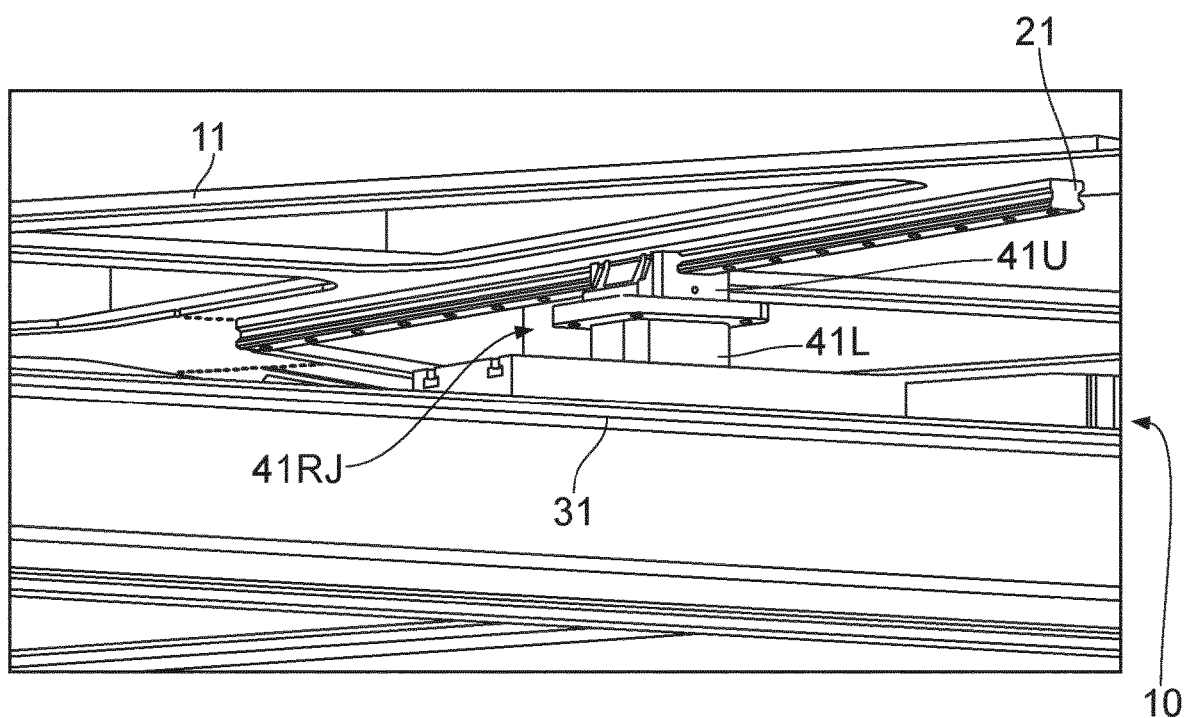
FIG. 3A is a further detailed view of the primary motion generator of the motion system of FIG. 1 without the base.

The primary motion generator 10 is shown in FIGS. 1-3 in a neutral condition. In this condition, the positions of the upper and lower carriage components of carriages 41, 42 and 43 are:

| Actuator-engaging carriage component 41L position | Nominal |
|---|---|
| Actuator-engaging carriage component 43L position | Nominal |
| Actuator-engaging carriage component 42L position | Nominal |
| Actuator-engaging carriage component 41U position | Nominal |
| Actuator-engaging carriage component 43U position | Nominal |
| Actuator-engaging carriage component 42U position | Nominal |

Operation of Primary Motion Generator

Figure 4:
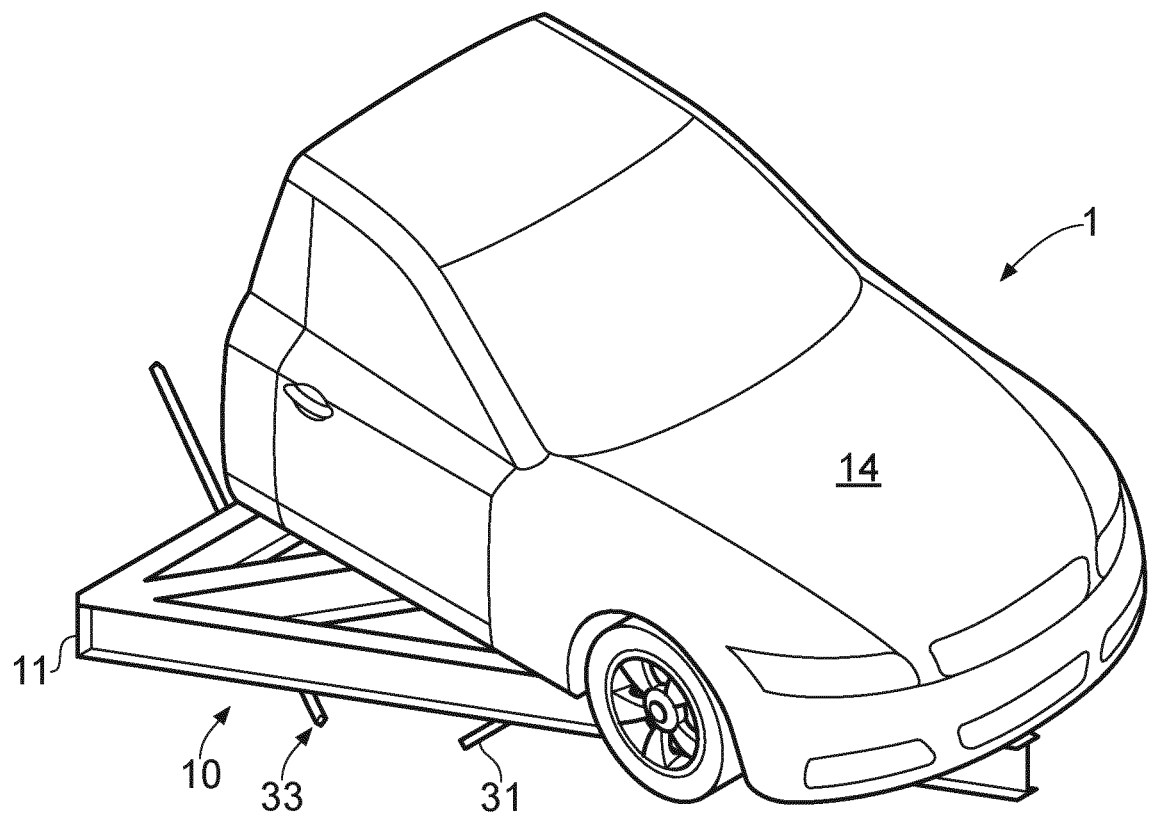
FIG. 4 is a perspective view of the motion system of FIG. 1 showing the primary motion generator without the base in a surge forward condition.
Figure 5:
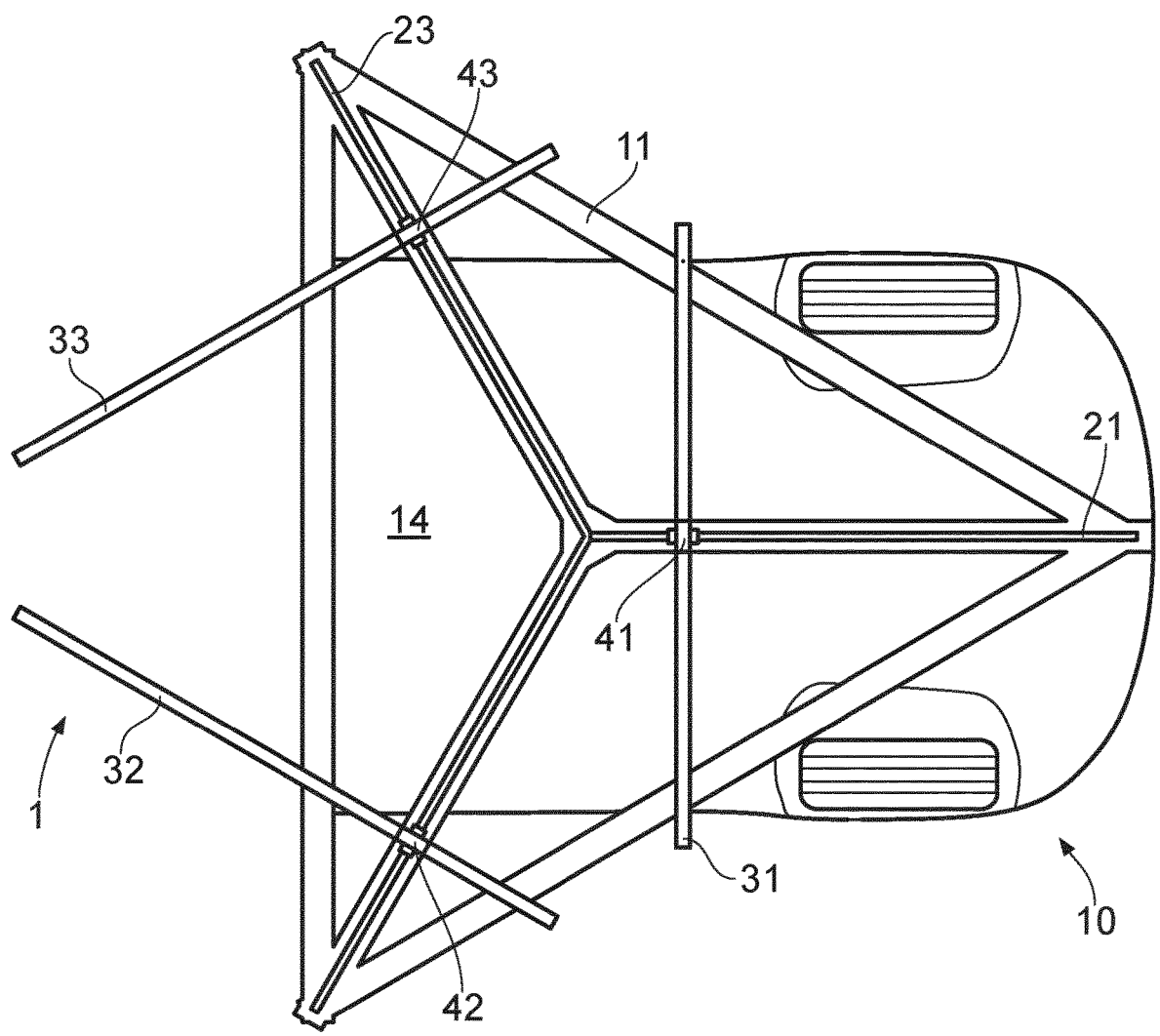
FIG. 5 is a plan view from below of the motion system as shown in FIG. 4 without the base.
Figure 37:
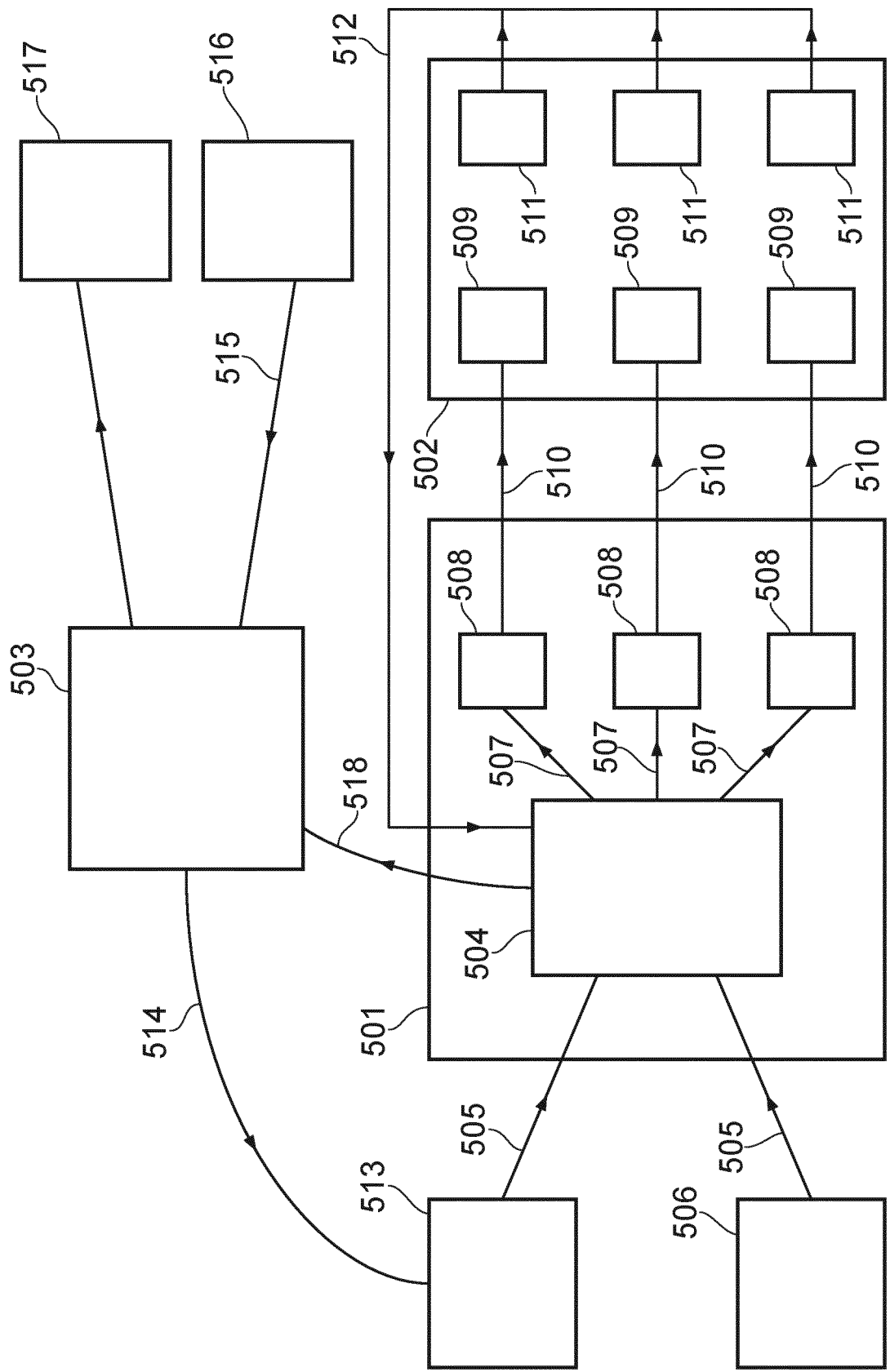
FIG. 37 is a diagram illustrating a control system for use with motion generators, motion systems or motion simulators in accordance with the invention.

The primary motion generator 10 is operated as described in relation to FIG. 4 to 13 under the control of a control system (not shown in FIG. 4 to 13, but for example as shown in FIG. 37). FIGS. 4 and 5 show the motion generator of FIG. 1 in a surge forward condition. In this condition, the positions of the upper and lower carriage components of carriages 41, 42 and 43 are:

| Actuator-engaging carriage component 41L position | Nominal |
|---|---|
| Actuator-engaging carriage component 43L position | Negative direction |
| Actuator-engaging carriage component 42L position | Positive direction |
| Actuator-engaging carriage component 41U position | Towards Support Frame centre |
| Actuator-engaging carriage component 43U position | Towards Support Frame perimeter |
| Actuator-engaging carriage component 42U position | Towards Support Frame perimeter |

Figure 6:
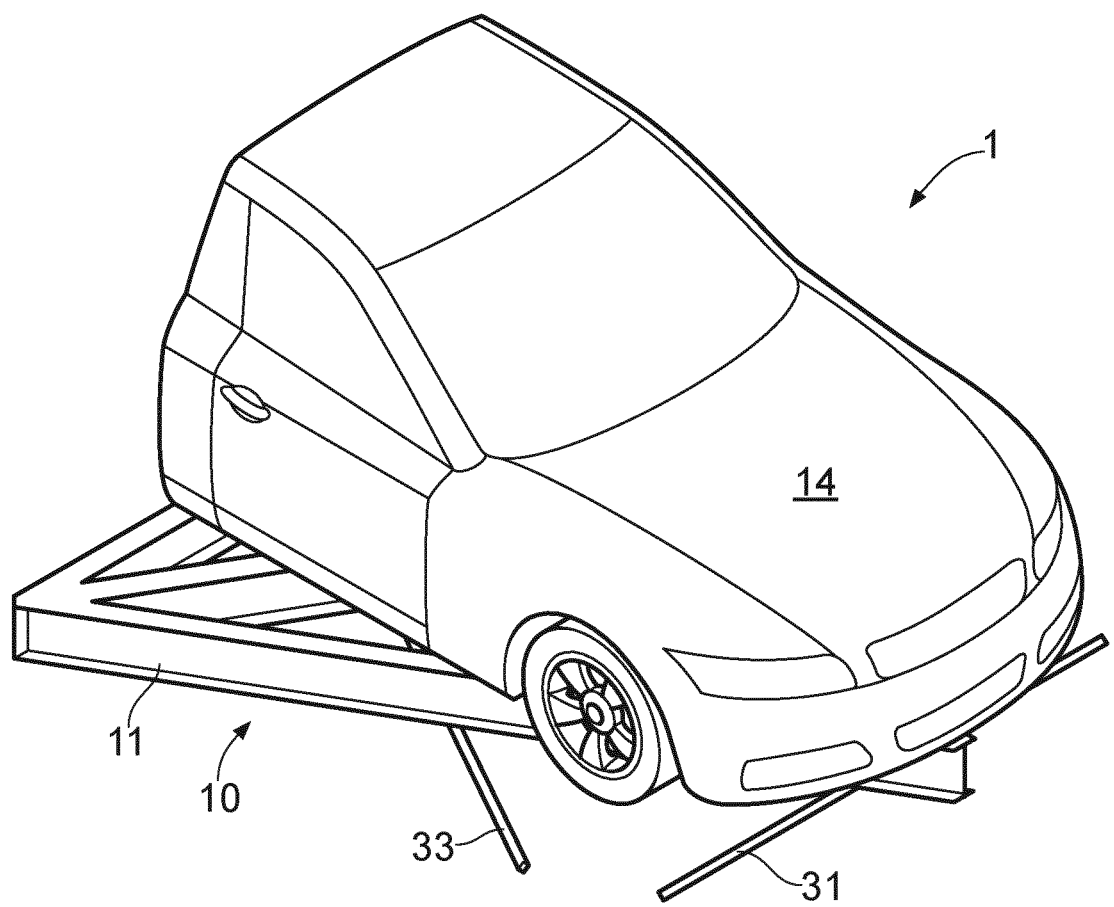
FIG. 6 is a perspective view of the motion system of FIG. 1 showing the primary motion generator without the base in a surge rearwards condition.
Figure 7:
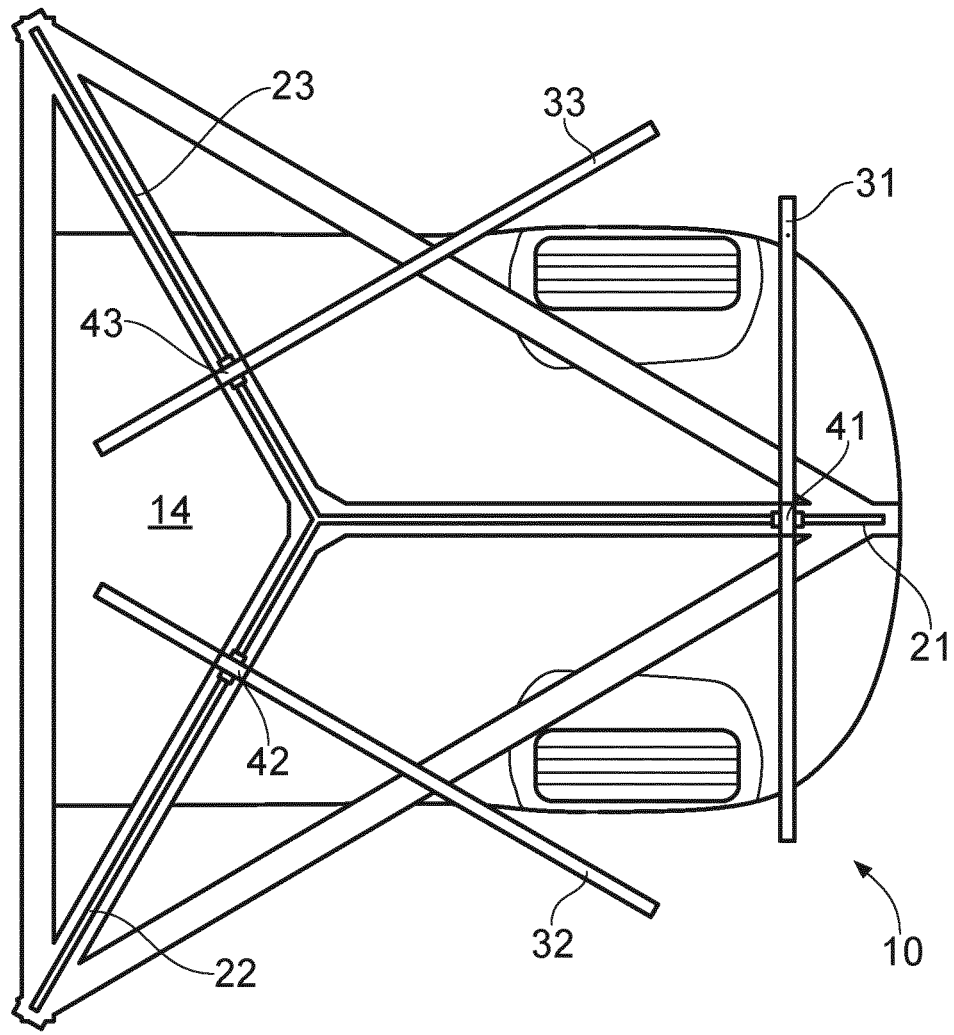
FIG. 7 is a plan view from below of the motion system as shown in FIG. 6 without the base.

FIGS. 6 and 7 show the motion generator 10 of FIG. 1 in a surge rearwards condition. In this condition, the positions of the tipper and lower carriage components of carriages 41, 42 and 43 are:

| Actuator-engaging carriage component 41L position | Nominal |
|---|---|
| Actuator-engaging carriage component 43L position | Positive direction |
| Actuator-engaging carriage component 42L position | Negative direction |
| Actuator-engaging carriage component 41U position | Towards Support Frame perimeter |
| Actuator-engaging carriage component 43U position | Towards Support Frame centre |
| Actuator-engaging carriage component 42U position | Towards Support Frame centre |

Figure 8:
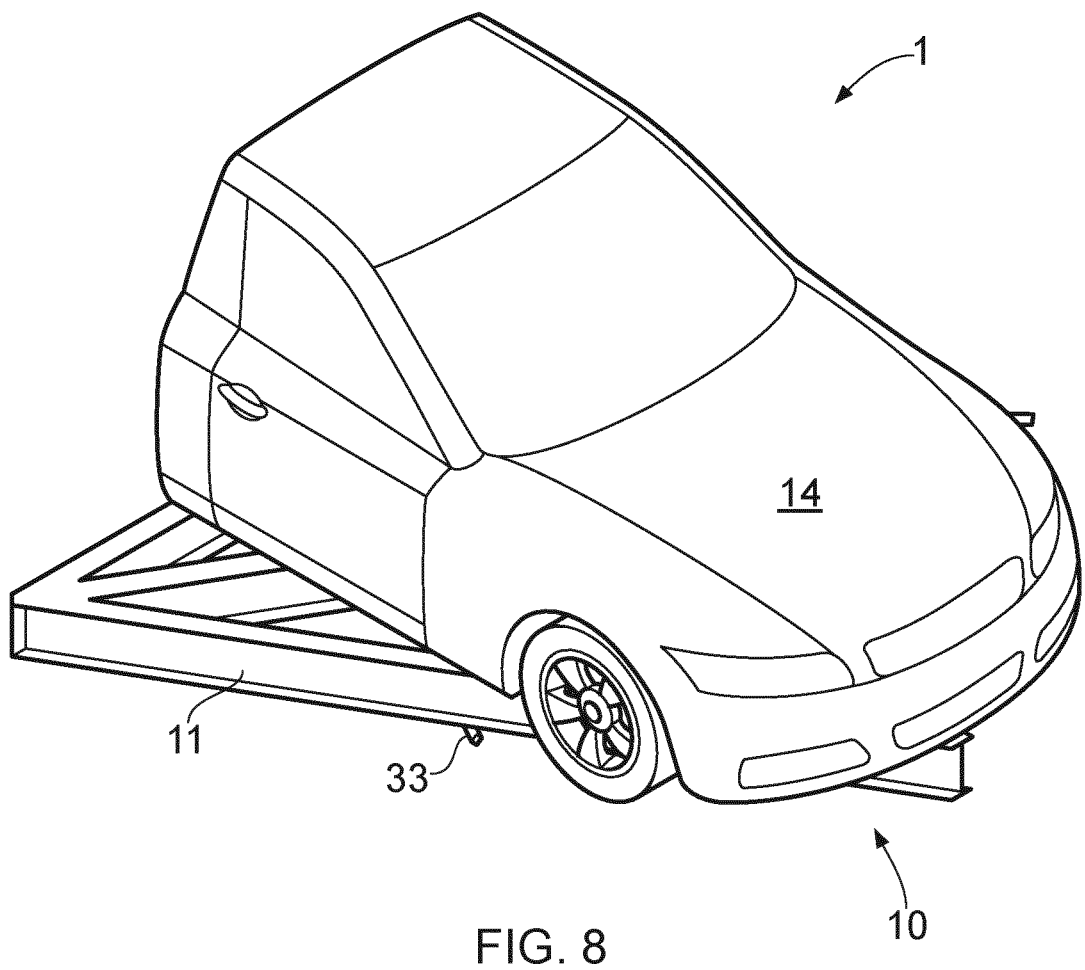
FIG. 8 is a perspective view of the motion system of FIG. 1 without the base showing the primary motion generator in a swaying rightwards condition.
Figure 9:
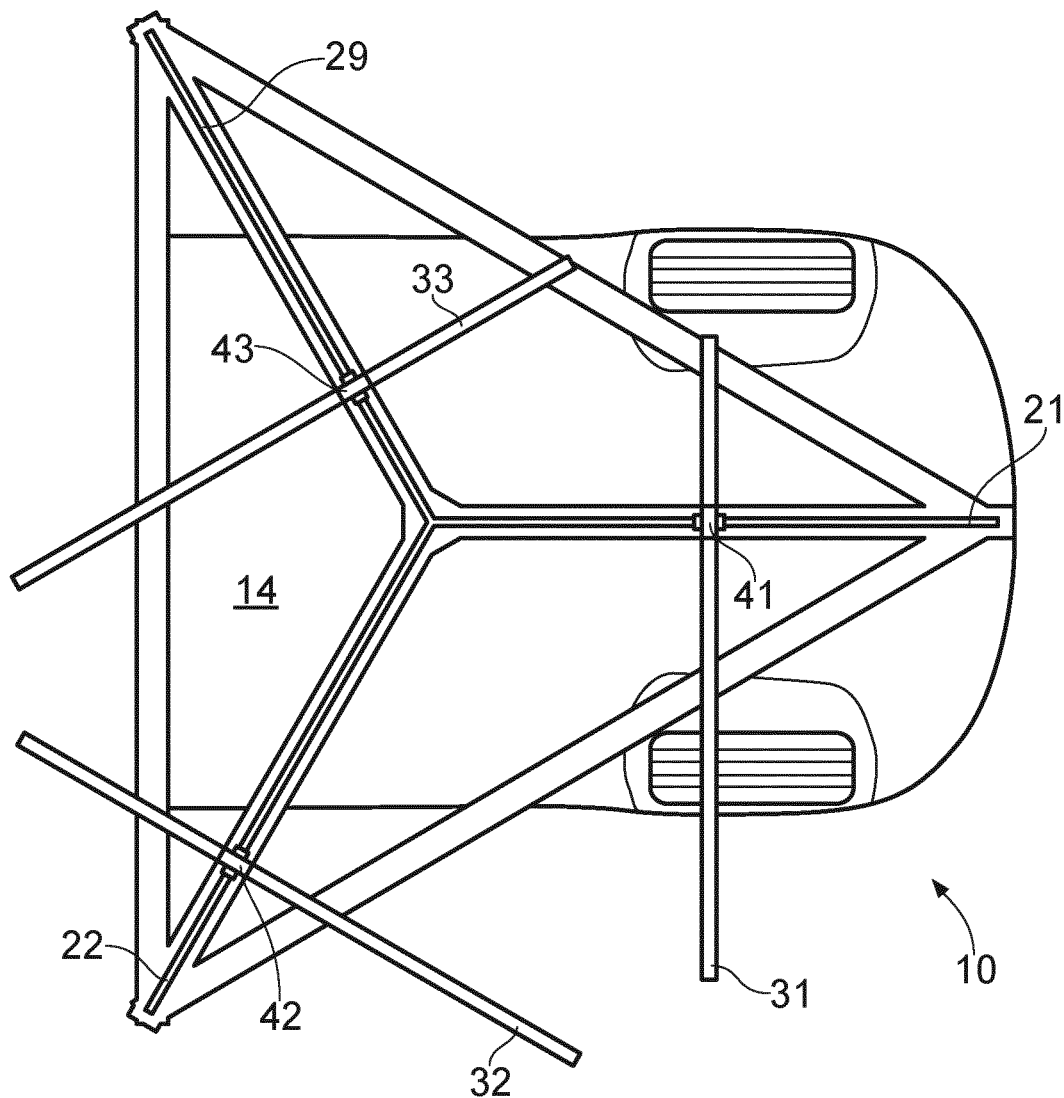
FIG. 9 from below of the motion system as shown in FIG. 8 without the base.

FIGS. 8 and 9 show the motion generator of FIG. 1, in a swaying rightwards condition. In this condition, the positions of the upper and lower carriage components of carriages 41, 42 and 43 are:

| | |
|---|---|
| Actuator-engaging carriage component 41L position | Negative direction |
| Actuator-engaging carriage component 43L position | Positive direction |
| Actuator-engaging carriage component 42L position | Positive Direction |
| Actuator-engaging carriage component 41U position | Nominal |
| Actuator-engaging carriage component 43U position | Towards Support Frame perimeter |
| Actuator-engaging carriage component 42U position | Towards Support Frame centre |

Figure 10:
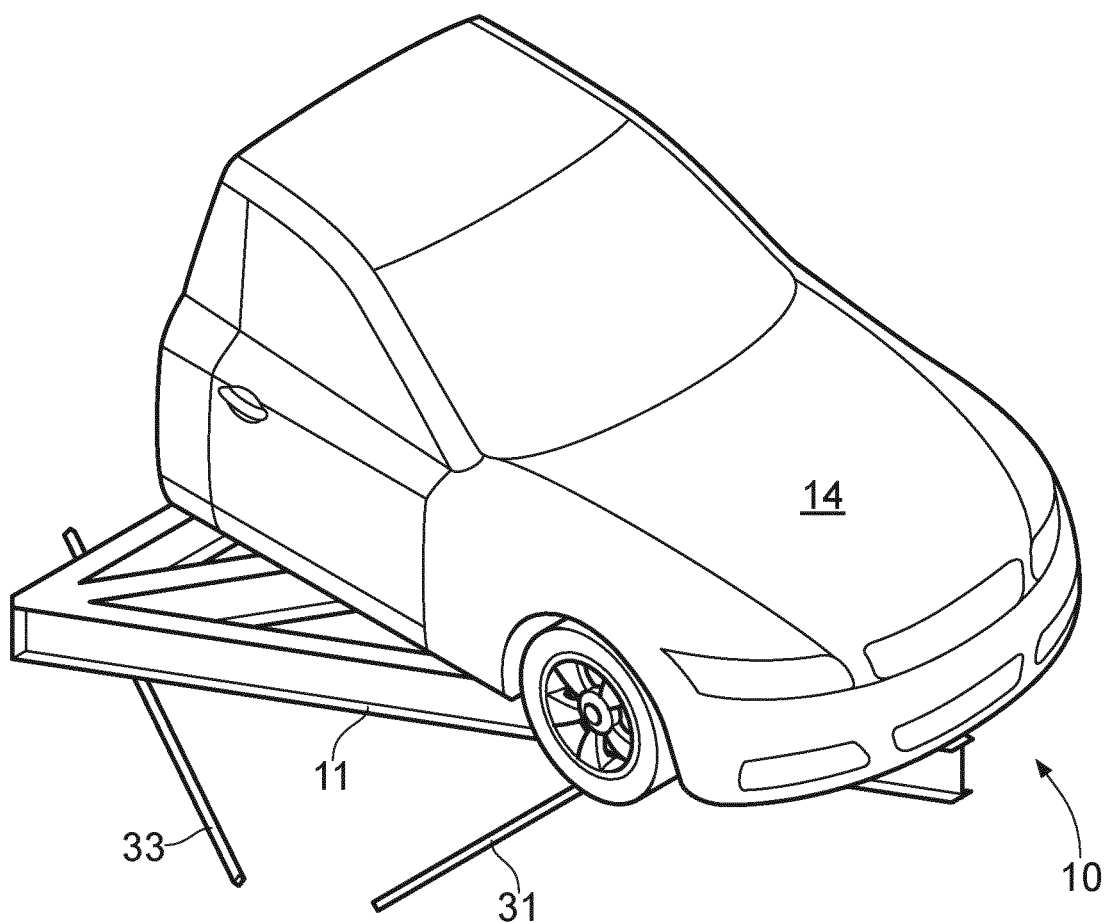
FIG. 10 is a perspective view of the motion system of FIG. 1 showing the primary motion generator without the base swaying leftwards condition.
Figure 11:
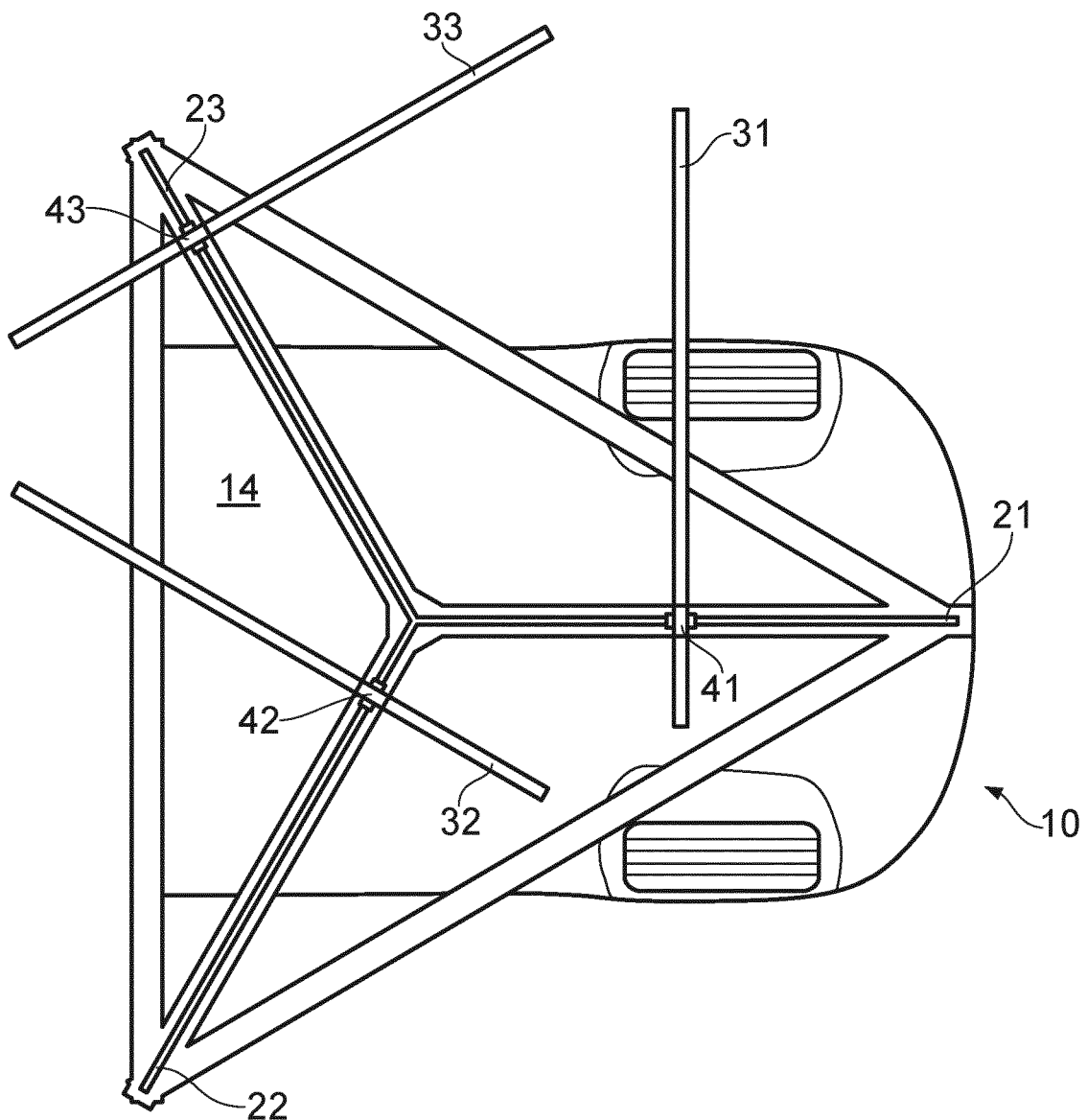
FIG. 11 is a plan view from below of the motion system shown in FIG. 10 without the base.

FIGS. 10 and 11 show the motion generator of FIG. 1 in a swaying leftwards condition. In this condition, the positions of the upper and lower carriage components of carriages 41, 42 and 43 are:

| | |
|---|---|
| Actuator-engaging carriage component 41L position | Positive direction |
| Actuator-engaging carriage component 43L position | Negative direction |
| Actuator-engaging carriage component 42L position | Negative direction |
| Actuator-engaging carriage component 41U position | Nominal |
| Actuator-engaging carriage component 43U position | Towards Support Frame centre |
| Actuator-engaging carriage component 42U position | Towards Support Frame perimeter |

Figure 12:
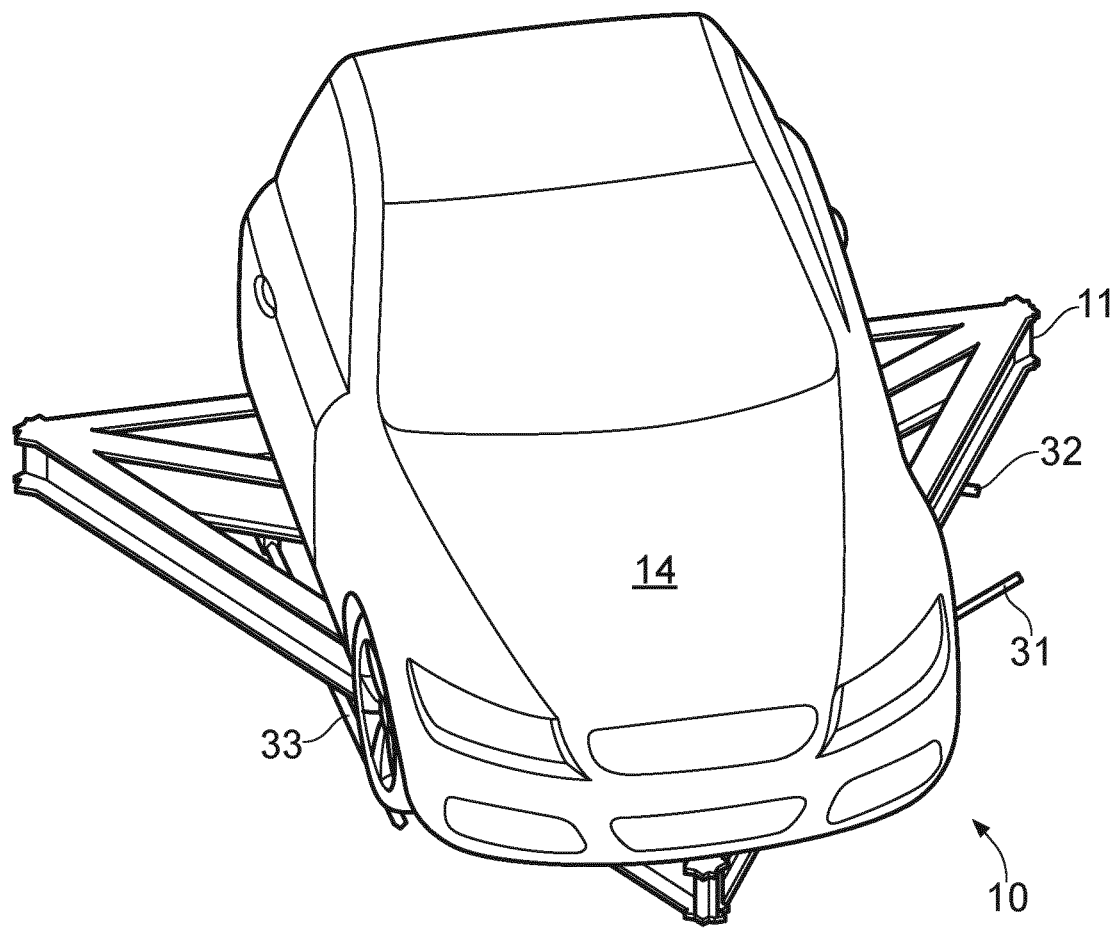
FIG. 12 is a perspective view of the motion system of FIG. 1 showing the primary motion generator without the base yawing anticlockwise.
Figure 13:
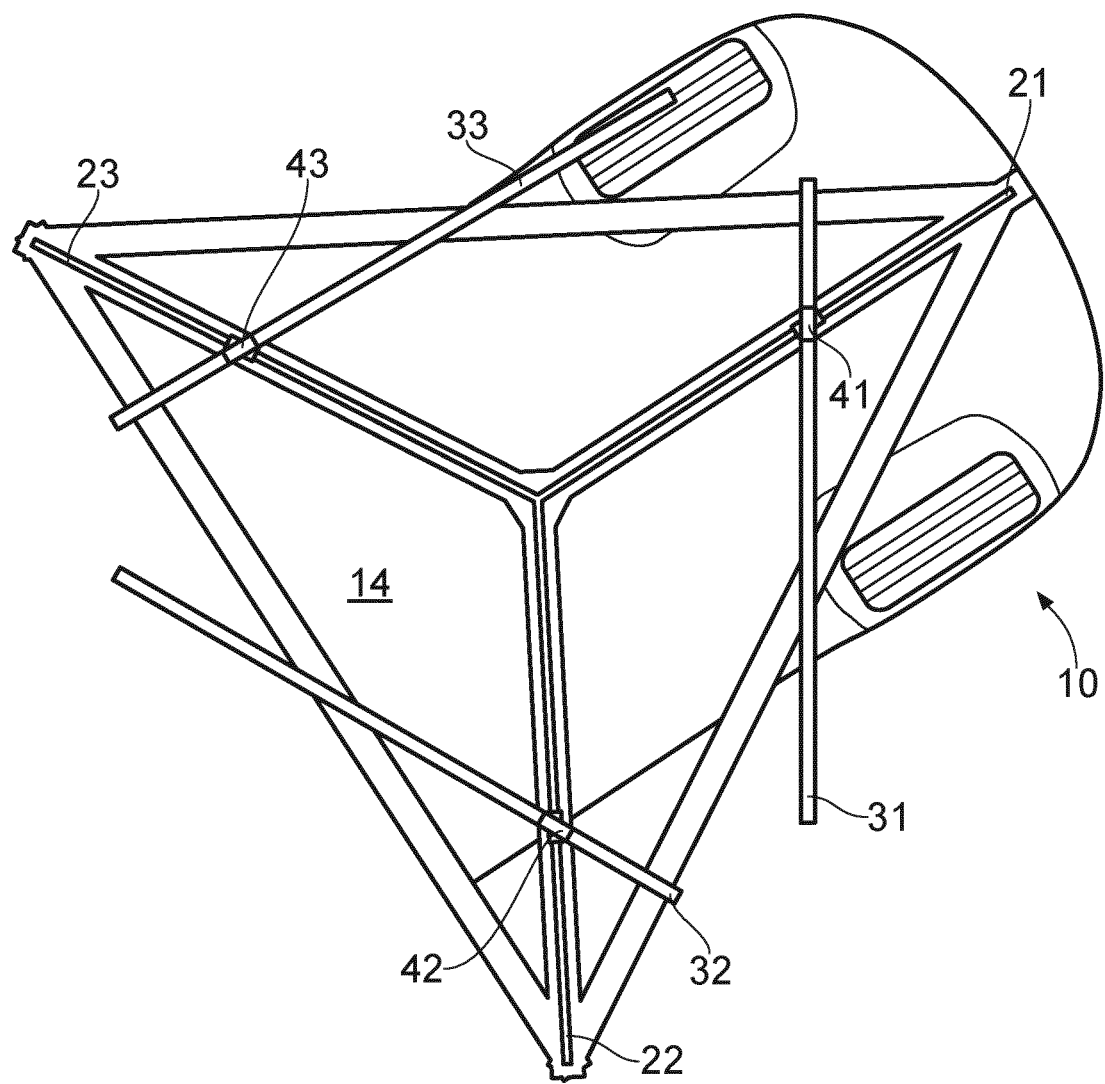
FIG. 13 is a plan view from below of the motion system shown in FIG. 12 without the base.
Figure 14:
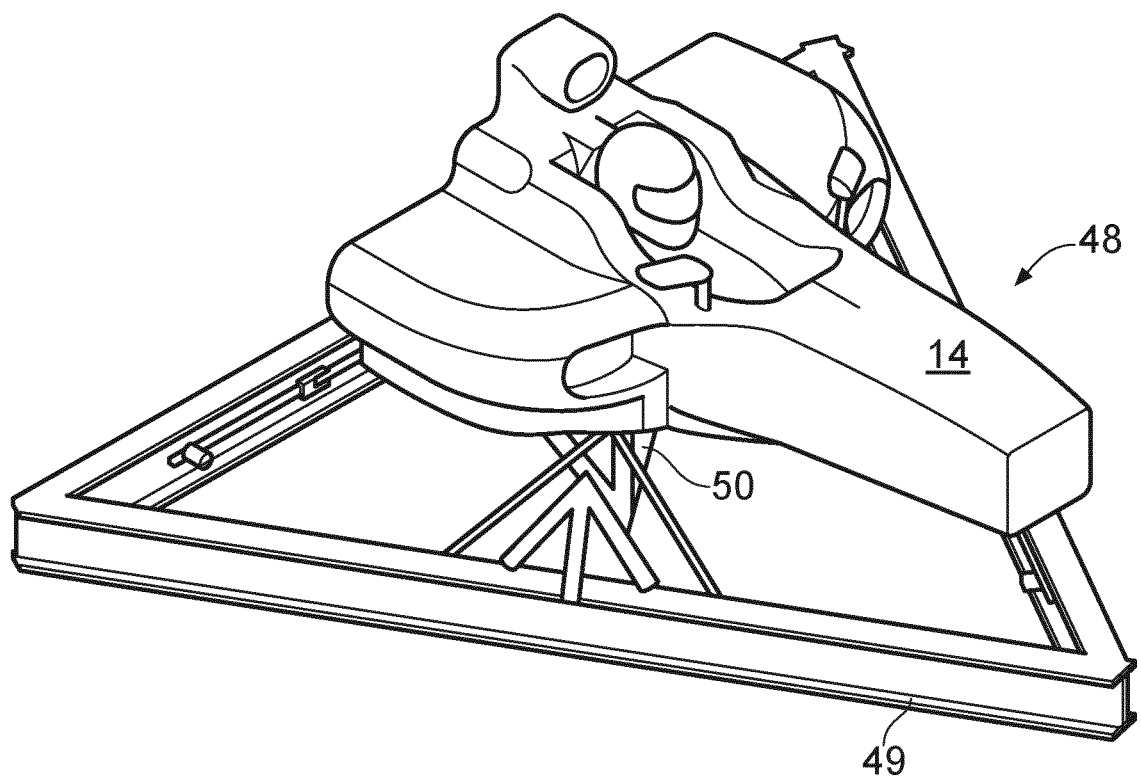
FIG. 14 is a perspective view of a secondary motion generator for use in a motion system in accordance with the invention without a base and in a neutral condition.
Figure 15:
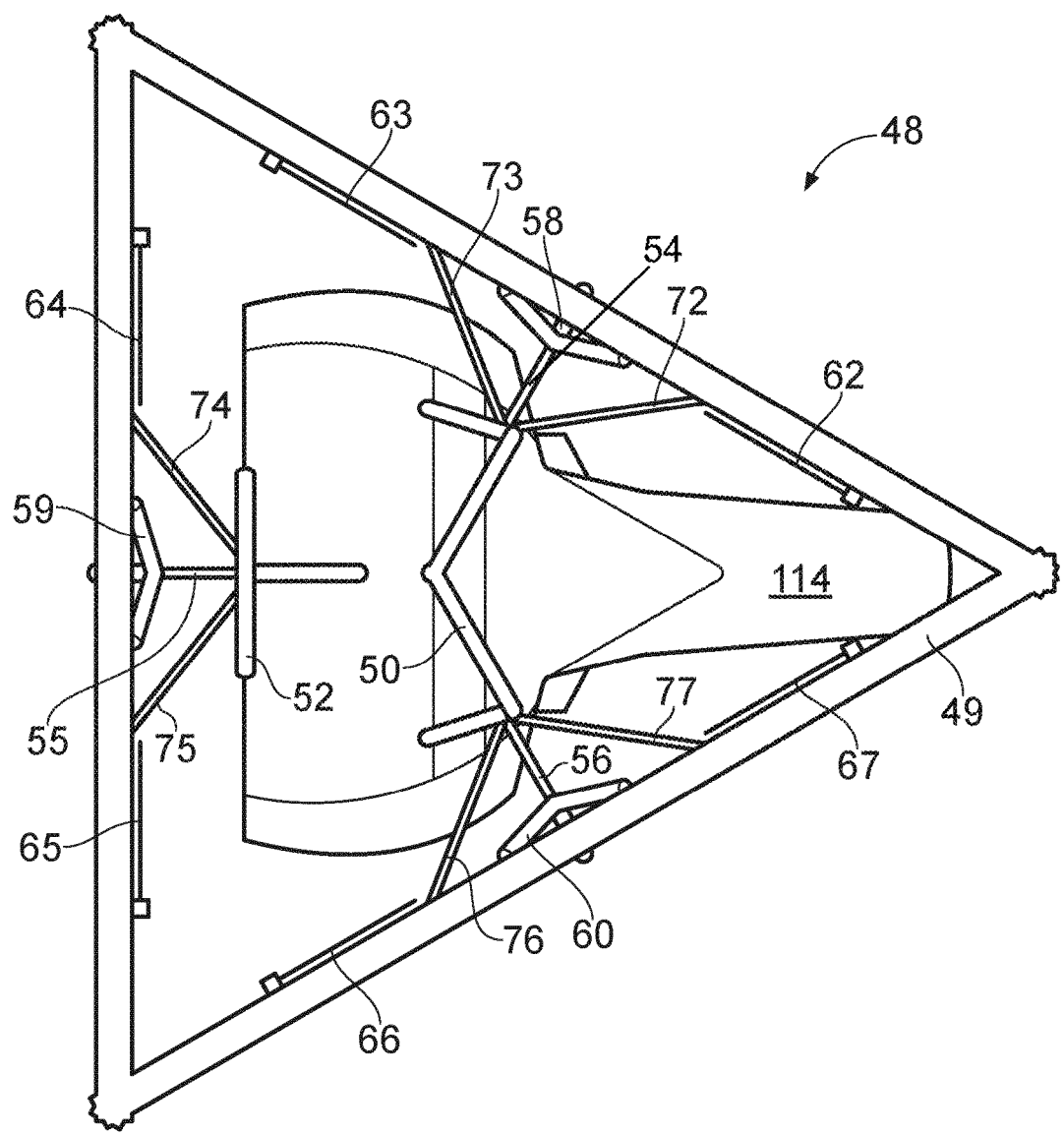
FIG. 15 is a plan view from below of the secondary motion generator shown in FIG. 14 without the base.
Figure 16:
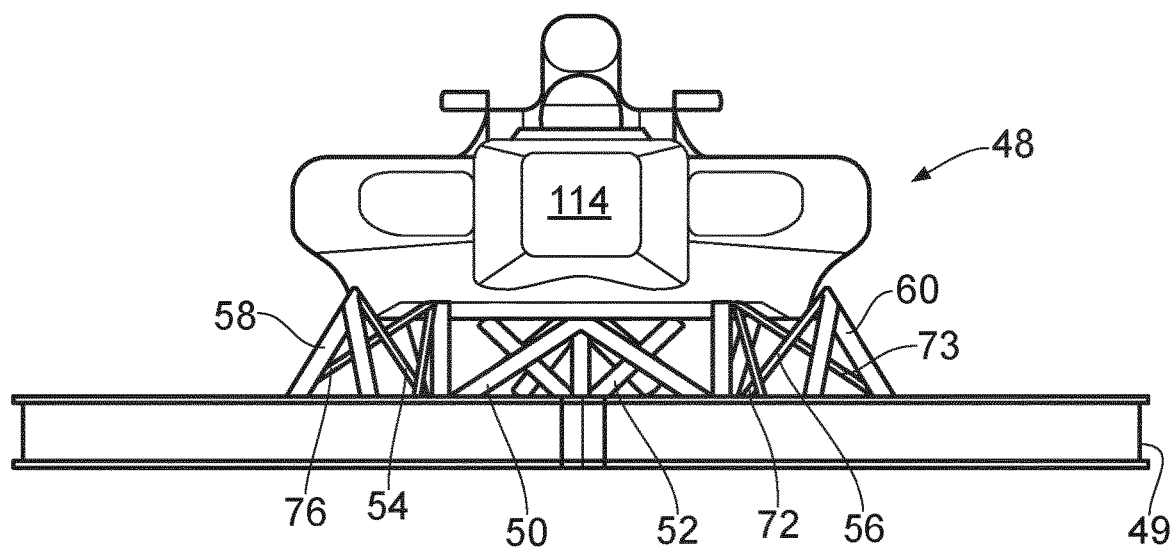
FIG. 16 is an elevation of the secondary motion generator shown in FIG. 14 without the base.
Figure 17:
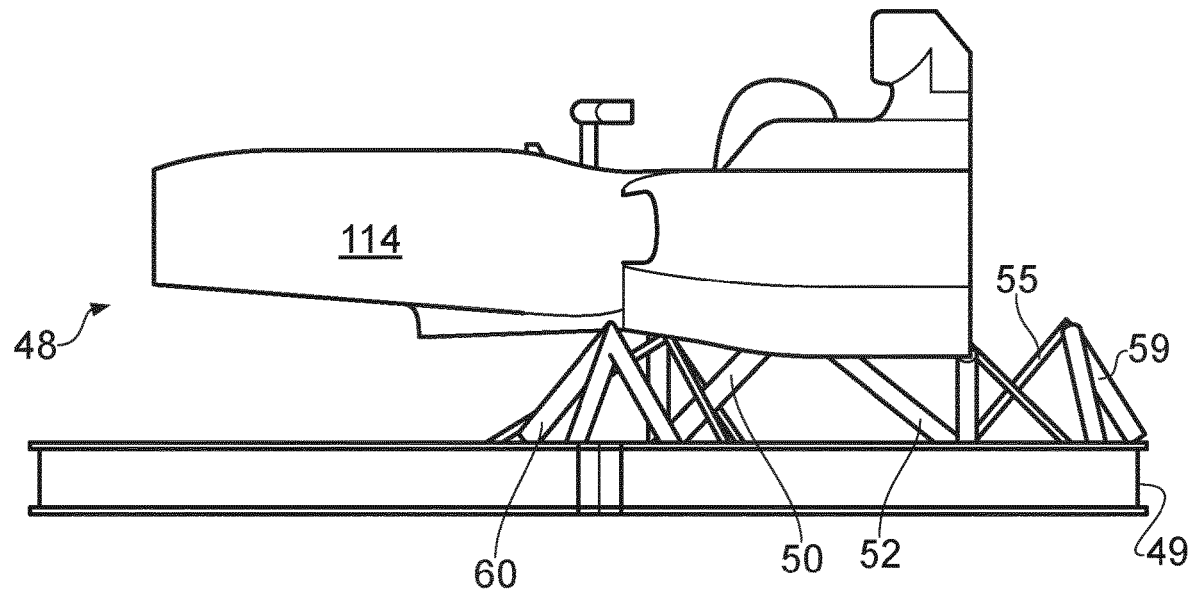
FIG. 17 is an elevational view from the left-hand side of a portion of the secondary motion generator shown in FIG. 14 in more detail.

FIGS. 12 and 13 show the motion generator of FIG. 1 yawing anticlockwise. In this condition, the positions of the upper and lower carriage components of carriages 41, 42 and 43 are:

| | |
|---|---|
| Actuator-engaging carriage component 41L position | Positive direction |
| Actuator-engaging carriage component 43L position | Positive direction |
| Actuator-engaging carriage component 42L position | Positive direction |
| Actuator-engaging carriage component 41U position | Towards Support Frame perimeter |
| Actuator-engaging carriage component 43U position | Towards Support Frame perimeter |
| Actuator-engaging carriage component 42U position | Towards Support Frame perimeter |

Conversely in a yawing clockwise condition, the positions of the upper and lower carriage components of carriages 41, 42 and 43 are:

| | |
|---|---|
| Actuator-engaging carriage component 41L position | Negative direction |
| Actuator-engaging carriage component 43L position | Negative direction |
| Actuator-engaging carriage component 42L position | Negative direction |
| Actuator-engaging carriage component 41U position | Towards Support Frame perimeter |
| Actuator-engaging carriage component 43U position | Towards Support Frame perimeter |
| Actuator-engaging carriage component 42U position | Towards Support Frame perimeter |

A Secondary Motion Generator

FIG. 14 to 31 show a secondary motion generator 48 which is intended for use in combination with a primary motion generator in accordance with the invention (not shown in FIGS. 14 to 31) to form a motion system.

The secondary motion generator 48 comprises a triangular frame 49, which is generally similar in construction to primary motion generator support frame 1 1 described above. Downwardly extending forward and rearward rigid tubular or solid frame components 50 and 52 respectively are fixed to the chassis 1 14, or an intermediate platform or frame on which the chassis 1 14 is mounted. It will be seen that the chassis 1 14, which in this example constitutes the payload of the secondary motion generator, represents a racing car and weighs about 250 kg. Elongate suspension elements 54, 55 and 56 are attached at one end thereof to the forward or rigid rearward frame components 50, 52, and at the other end to rigid upwardly extending mountings 58, 59 and 60 which extend from the frame 49 so as to suspend the chassis 1 14. The mountings 58, 59 and 60 may be fixed to or integral with the frame 49.

Figure 18:
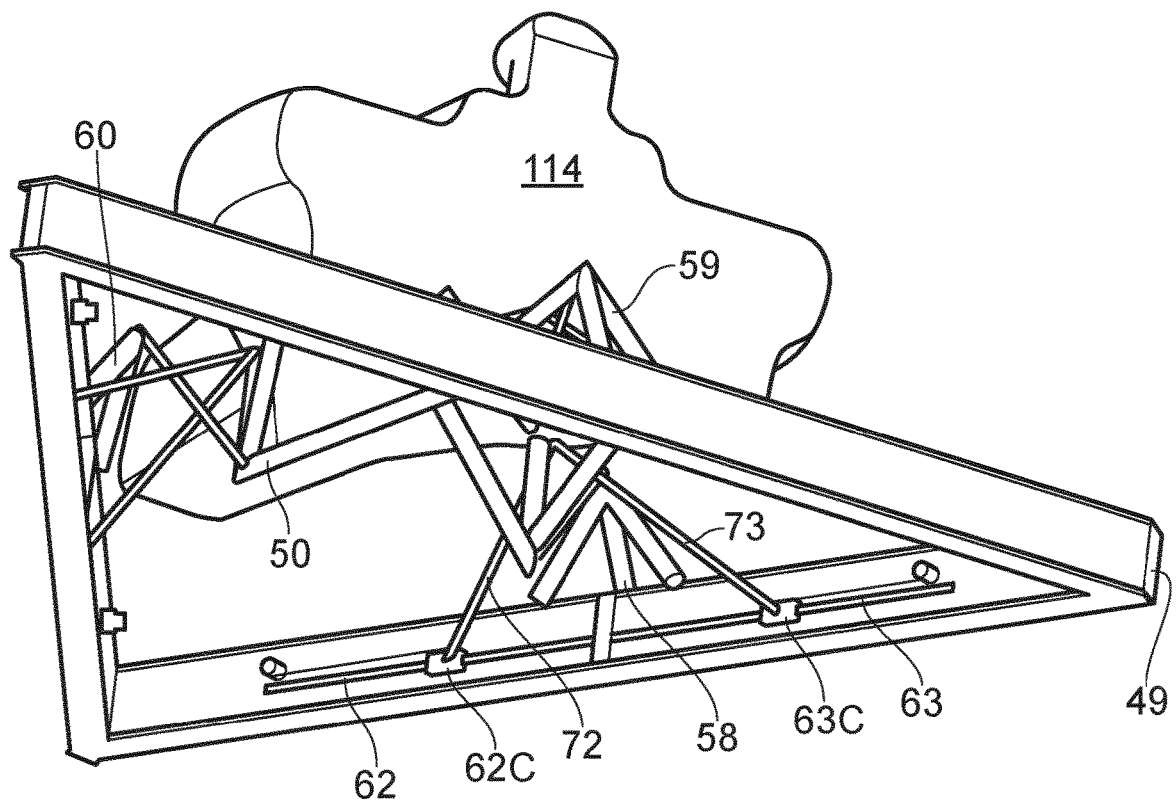
FIG. 18 is a perspective view from below of the secondary motion generator shown in FIG. 14 without the base.
Figure 19:
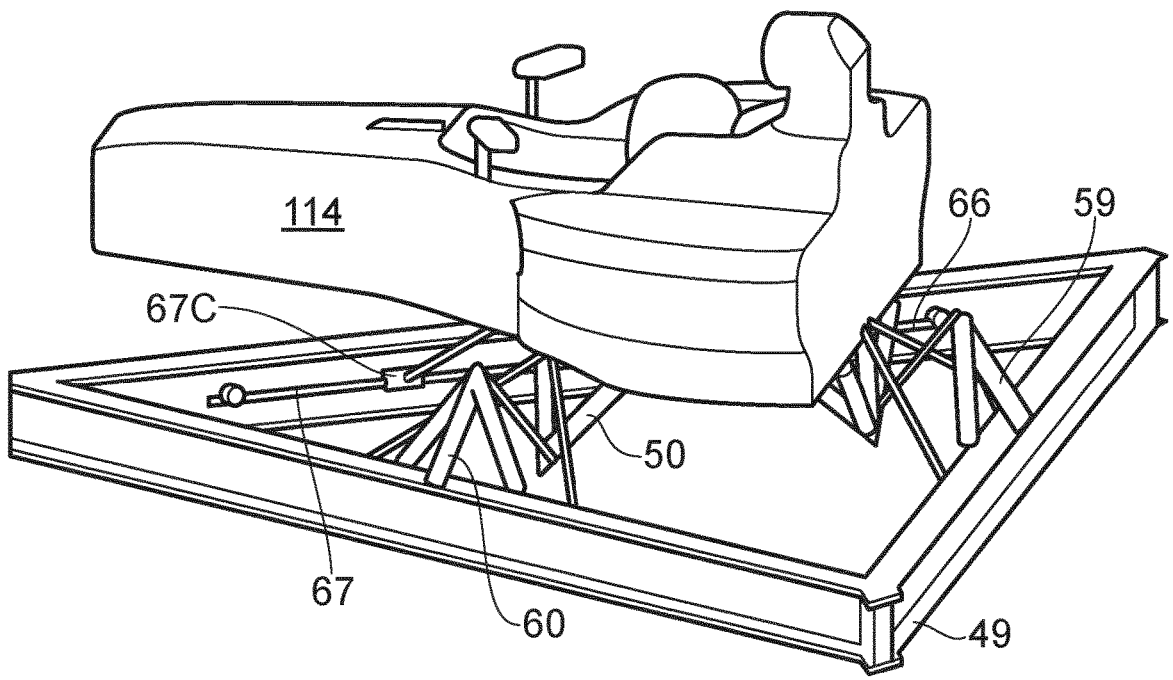
FIG. 19 is another perspective view of the secondary motion generator shown in FIG. 14 in a neutral condition without the base.
Figure 20:
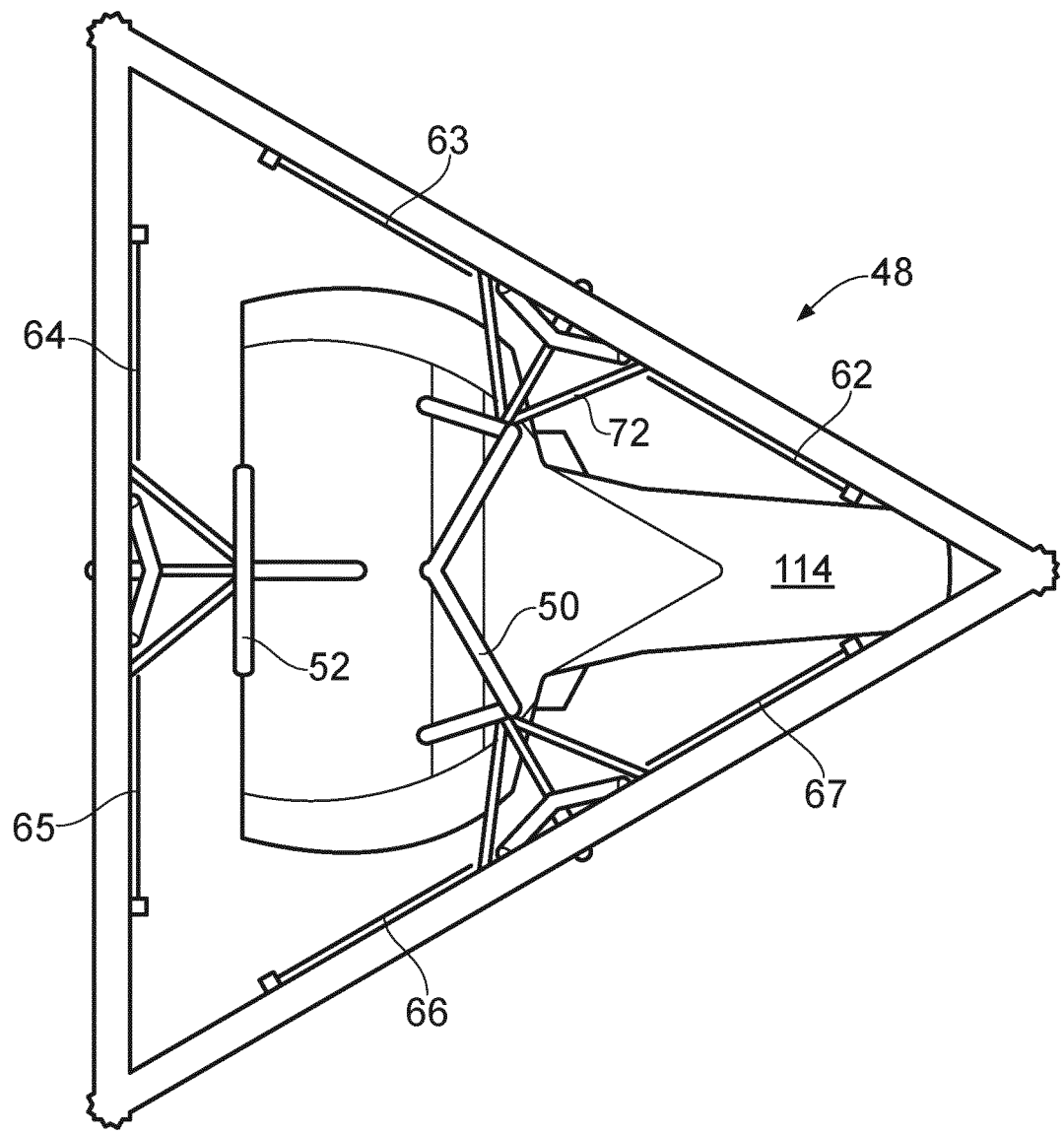
FIG. 20 is a plan view from below of the secondary motion generator shown in FIG. 14 in a surge forwards configuration without the base.

A series of pairs of linear actuators 62, 63; 64, 65; and 66, 67 are disposed within the perimeter of the frame 49. In this embodiment, the linear actuators 62-67 are belt-driven. Other low moving mass actuators are contemplated for example linear motors. As shown in FIG. 18, corresponding pairs of elongate tensile members 72, 73; 74, 75, and 76, 77, are fixed at one end to linear actuator carriages 62C, 63C, 64C, 65C, 66C, and 67C, and at their other end to the chassis 1 14 or an intermediate platform or frame. In use, the linear actuator carriages 62C, 63C, 64C, 65C, 66C, and 67C are driven linearly, in accordance with instructions from a secondary motion generator control system (for example as shown in FIG. 37) in either longitudinal direction by linear actuators 62-67 respectively so as to move the suspended chassis 1 14 with high bandwidth motion.

The operation of the secondary motion generator 48, and the movement of actuator carriages, under instructions from the control system, to move the chassis 1 14 in six degrees of freedom will now be described. It is shown in a neutral condition in FIGS. 14-20.

Figure 21:
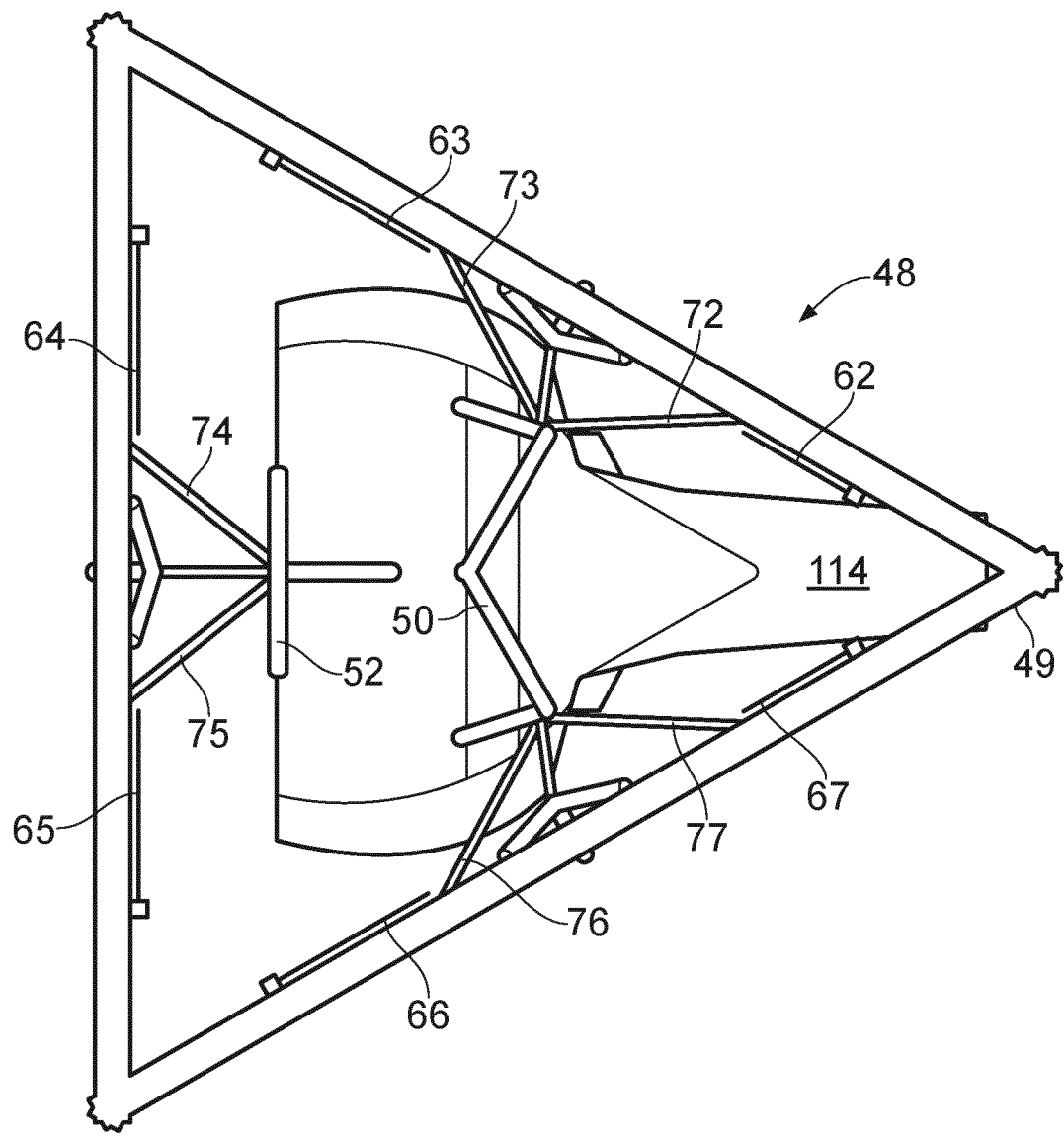
FIG. 21 is a plan view from below of the secondary motion generator shown in FIG. 14 in a surge backwards condition without the base.

In the surge forward condition shown in FIG. 21, the position of the actuator carriages 62C, 63C, 64C, 65C, 66C, and 67C is as follows:

| | |
|---|---|
| Actuator carriage 67C position | Outward |
| Actuator carriage 66C position | Inward |
| Actuator carriage 65C position | Inward |
| Actuator carriage 64C position | Inward |
| Actuator carriage 63C position | Inward |
| Actuator carriage 62C position | Outward |

Figure 22:
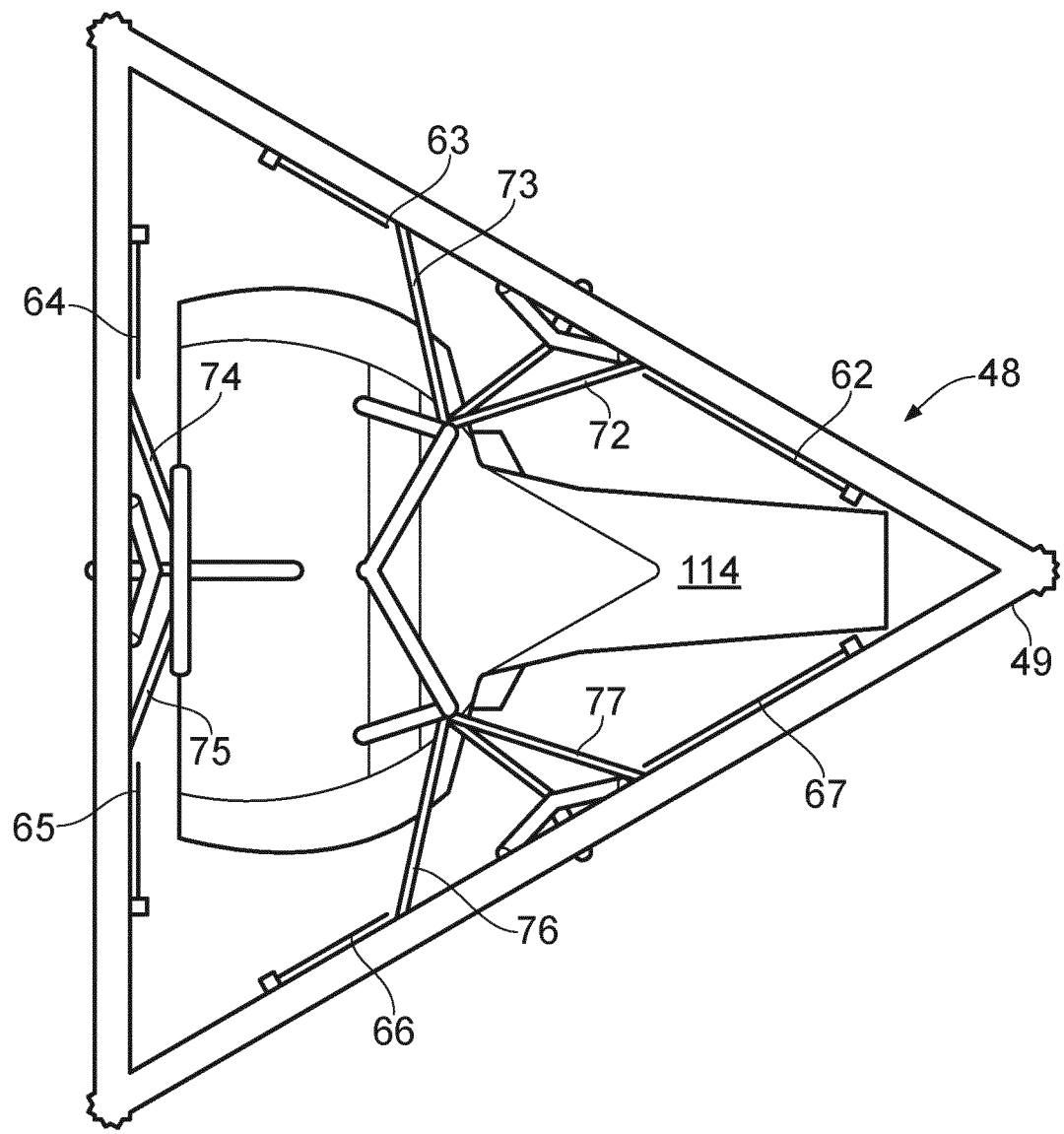
FIG. 22 is a plan view from below of the secondary motion generator shown in FIG. 14 in a sway left configuration without the base.

In the surge backwards condition shown in FIG. 22, the position of the actuator carriages 62C, 63C, 64C, 65C, 66C, and 67C is as follows.

| | |
|---|---|
| Actuator carriage 67C position | Inward |
| Actuator carriage 66C position | Outward |

| | |
|---|---|
| Actuator carriage 65C position | Outward |
| Actuator carriage 64C position | Outward |
| Actuator carriage 63C position | Outward |
| Actuator carriage 62C position | Inward |

Figure 23:
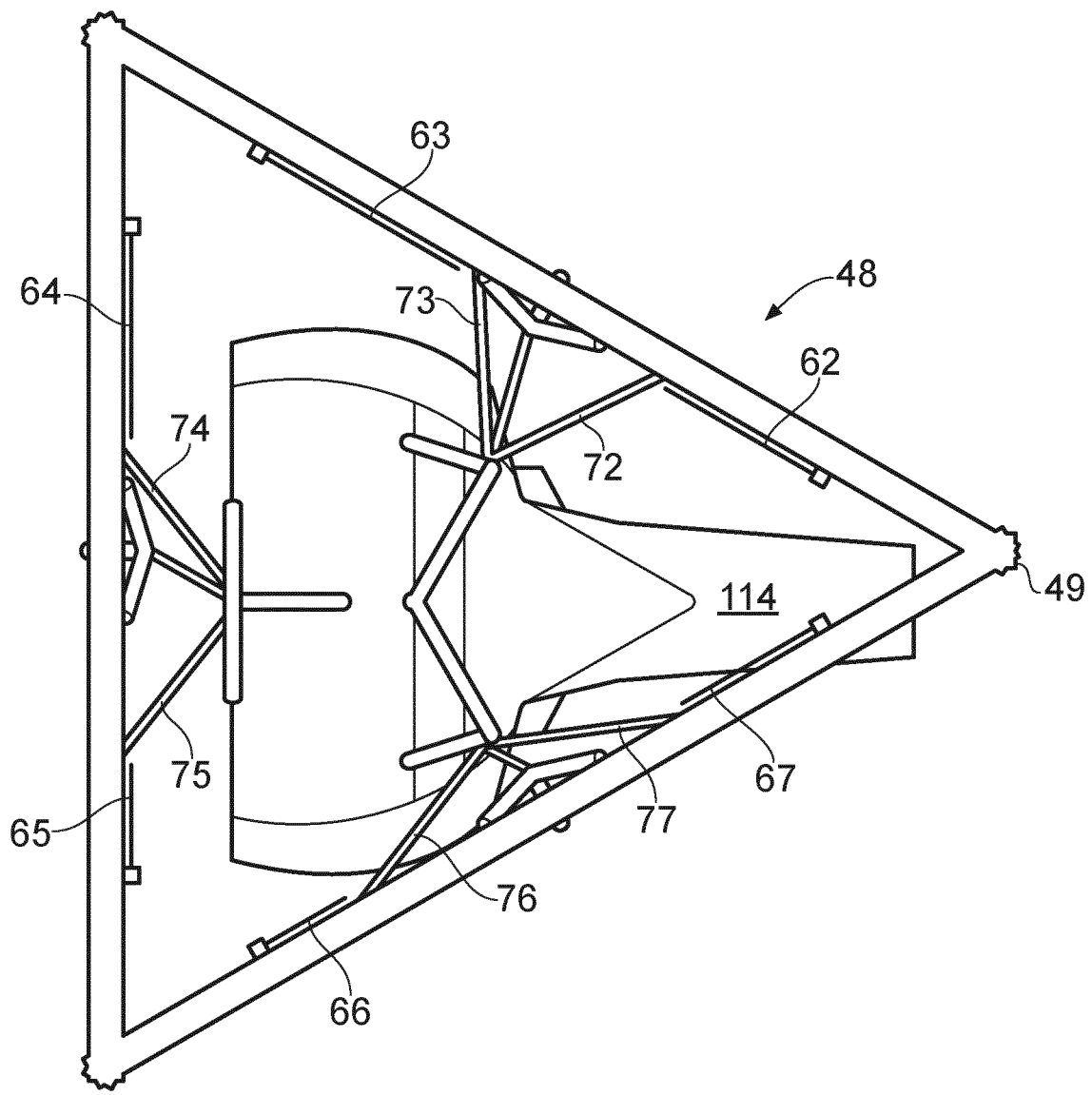
FIG. 23 is a plan view from below of the secondary motion generator shown in FIG. 14 in a sway right configuration without the base.

In the sway left condition shown in FIG. 23, the position of the actuator carriages 62C, 63C, 64C, 65C, 66C, and 67C is as follows:

| | |
|---|---|
| Actuator carriage 67C position | Outward |
| Actuator carriage 66C position | Outward |
| Actuator carriage 65C position | Outward |
| Actuator carriage 64C position | Inward |
| Actuator carriage 63C position | Inward |
| Actuator carriage 62C position | Inward |

Figure 24:
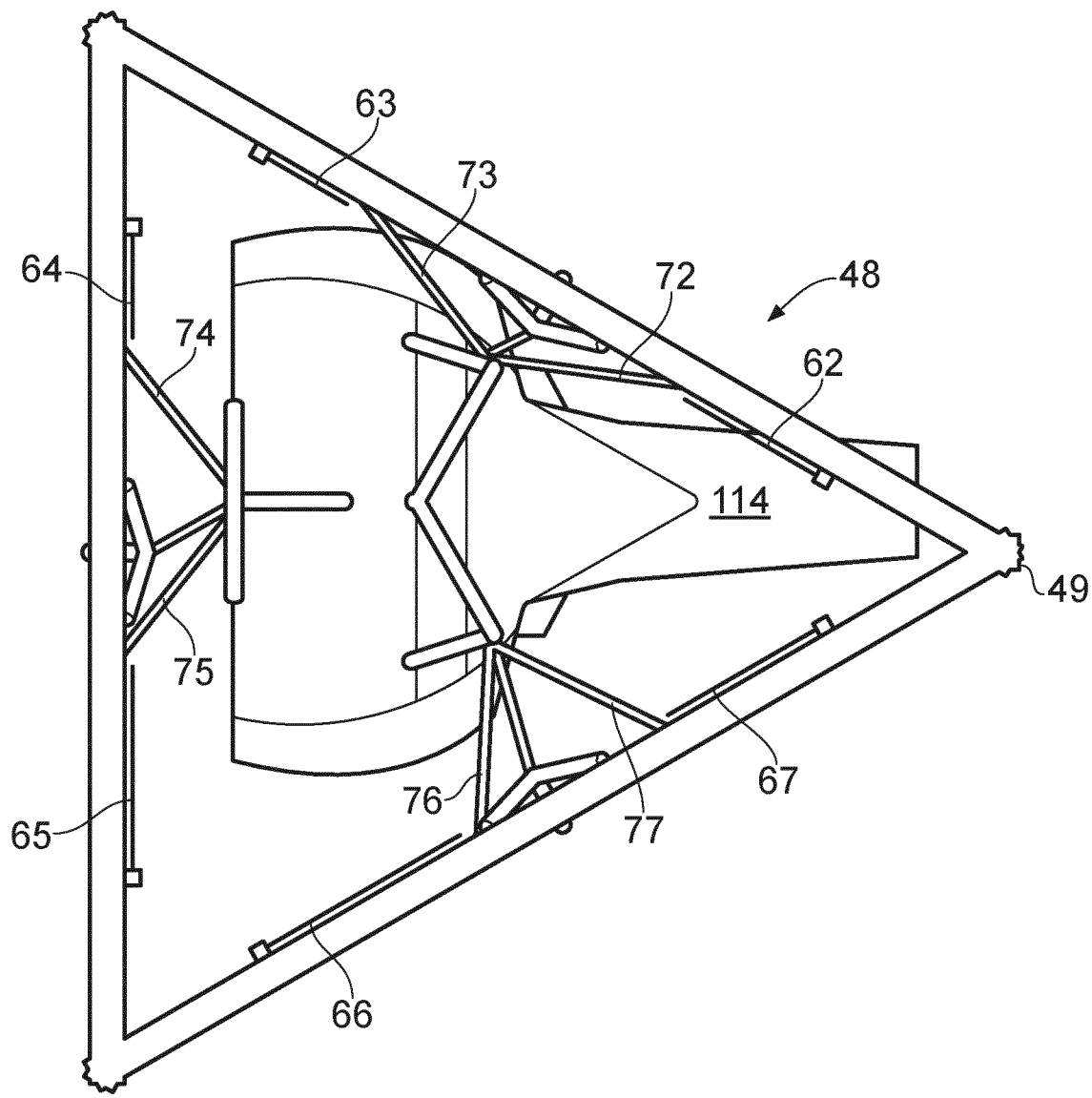
FIG. 24 is a plan view from below of the secondary motion generator shown in FIG. 14 in a heave up configuration without the base.

In the sway right condition shown in FIG. 24, the position of the actuator carriages 62C, 63C, 64C, 65C, 66C, and 67C is as follows:

| | |
|---|---|
| Actuator carriage 67C position | Inward |
| Actuator carriage 66C position | Inward |
| Actuator carriage 65C position | Inward |
| Actuator carriage 64C position | Outward |
| Actuator carriage 63C position | Outward |
| Actuator carriage 62C position | Outward |

Figure 25:
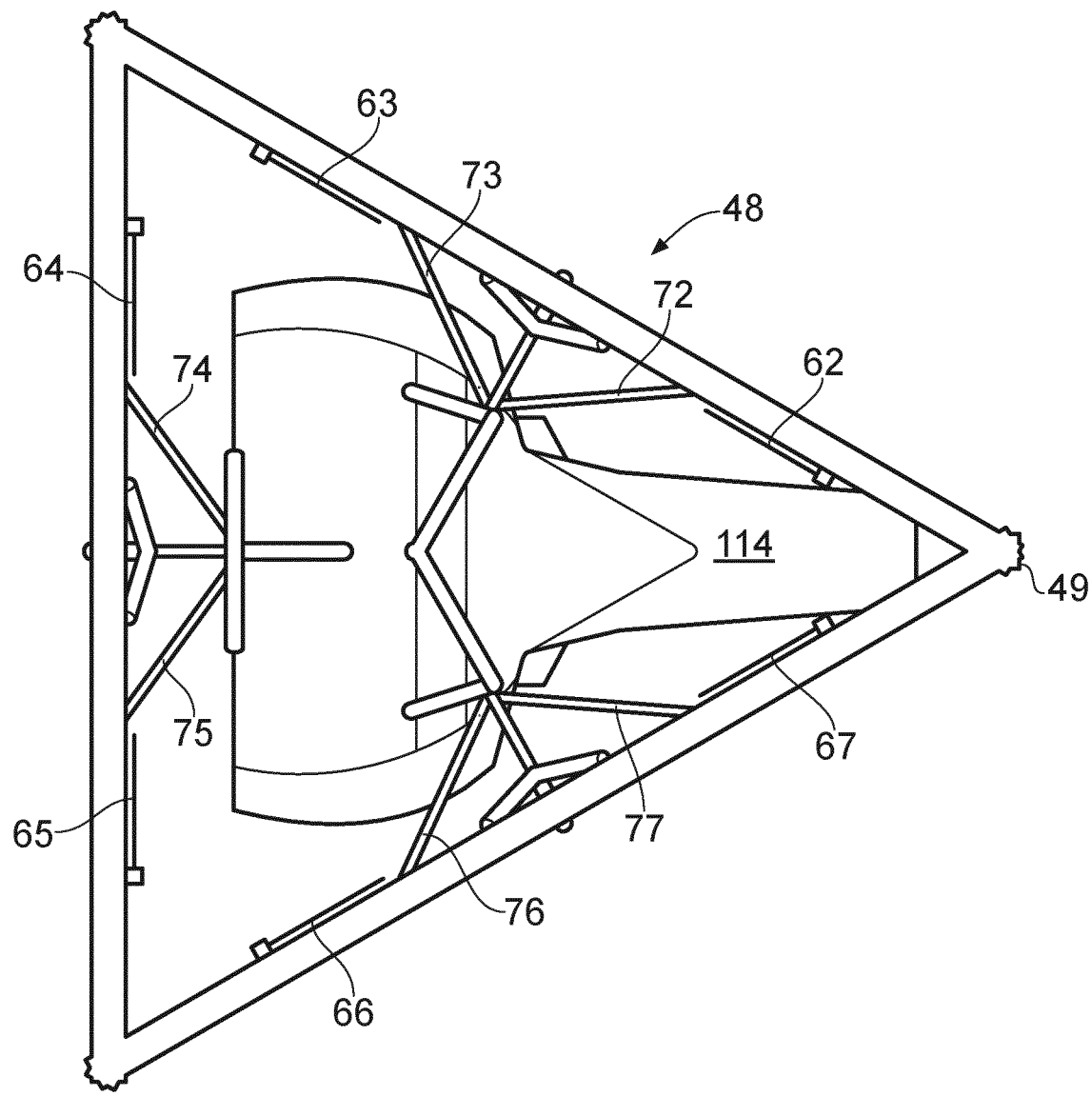
FIG. 25 is a plan view from below of the secondary motion generator shown in FIG. 14 in a heave down configuration without the base.

In the heave down condition shown in FIG. 25, the position of the actuator carriages 62C, 63, 64C, 65C, 66C and 67C is as follows:

| | |
|---|---|
| Actuator carriage 67C position | Outward |
| Actuator carriage 66C position | Outward |
| Actuator carriage 65C position | Outward |
| Actuator carriage 64C position | Outward |
| Actuator carriage 63C position | Outward |
| Actuator carriage 62C position | Outward |

Conversely, in a heave p condition, the position of the actuator carriages 62C, 63C, 64C, 65C, 66C, and 67C is as follows:

| | |
|---|---|
| Actuator carriage 67C position | Inward |
| Actuator carriage 66C position | Inward |
| Actuator carriage 65C position | Inward |
| Actuator carriage 64C position | Inward |
| Actuator carriage 63C position | Inward |
| Actuator carriage 62C position | Inward |

Figure 26:
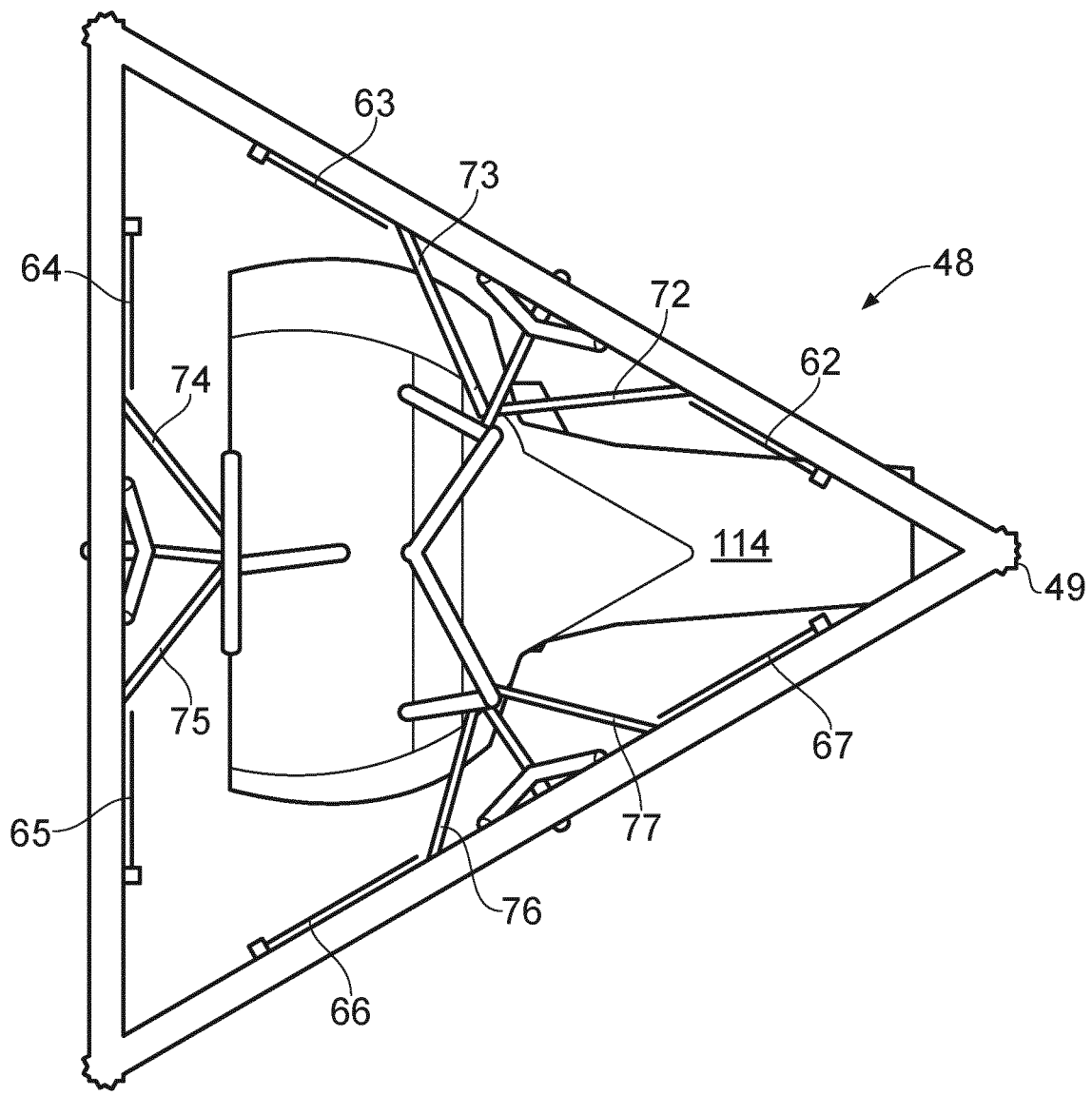
FIG. 26 is a plan view from below of the secondary motion generator shown in FIG. 14 in a roll right side down configuration without the base.

In the roll, right side down configuration shown in FIG. 26, the position of the actuator carriages 62C, 63C, 64C, 65C', 66C, and 67C is as follows:

| | |
|---|---|
| Actuator carriage 67C position | Inward |
| Actuator carriage 66C position | Inward |
| Actuator carriage 65C position | Neutral |
| Actuator carriage 64C position | Neutral |
| Actuator carriage 63C position | Outward |
| Actuator carriage 62C position | Outward |

Figure 27:
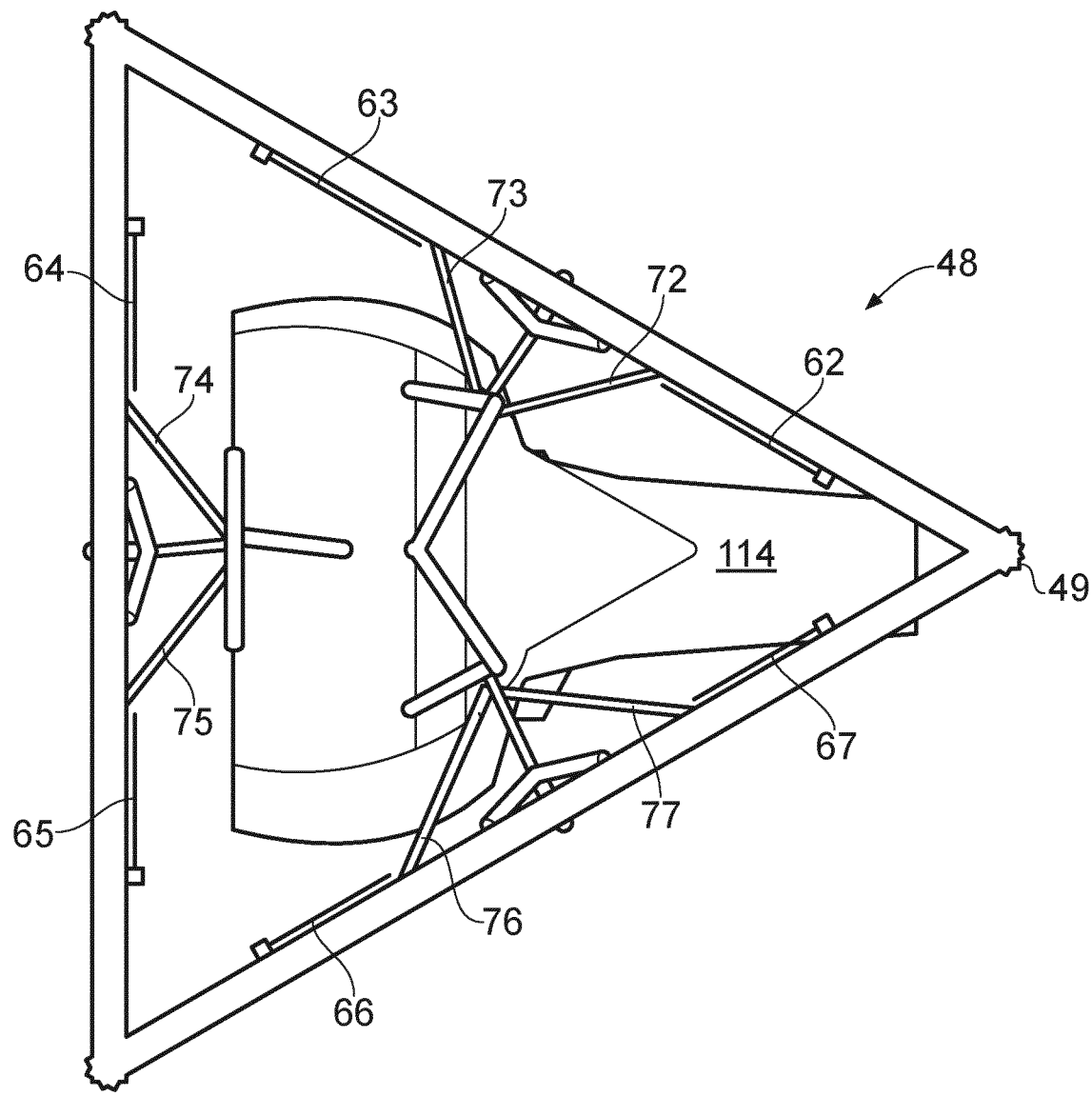
FIG. 27 is a plan view from below of the secondary motion generator shown in FIG. 14 in a roll right side up configuration without the base.

In the roll, right side up configuration shown in FIG. 27, the position of the actuator carriages 62C, 63C, 64C, 65C, 66C, and 67C is as follows:

| | |
|---|---|
| Actuator carriage 67C position | Outward |
| Actuator carriage 66C position | Outward |

| | |
|---|---|
| Actuator carriage 65C position | Neutral |
| Actuator carriage 64C position | Neutral |
| Actuator carriage 63C position | Inward |
| Actuator carriage 62C position | Inward |

Figure 28:
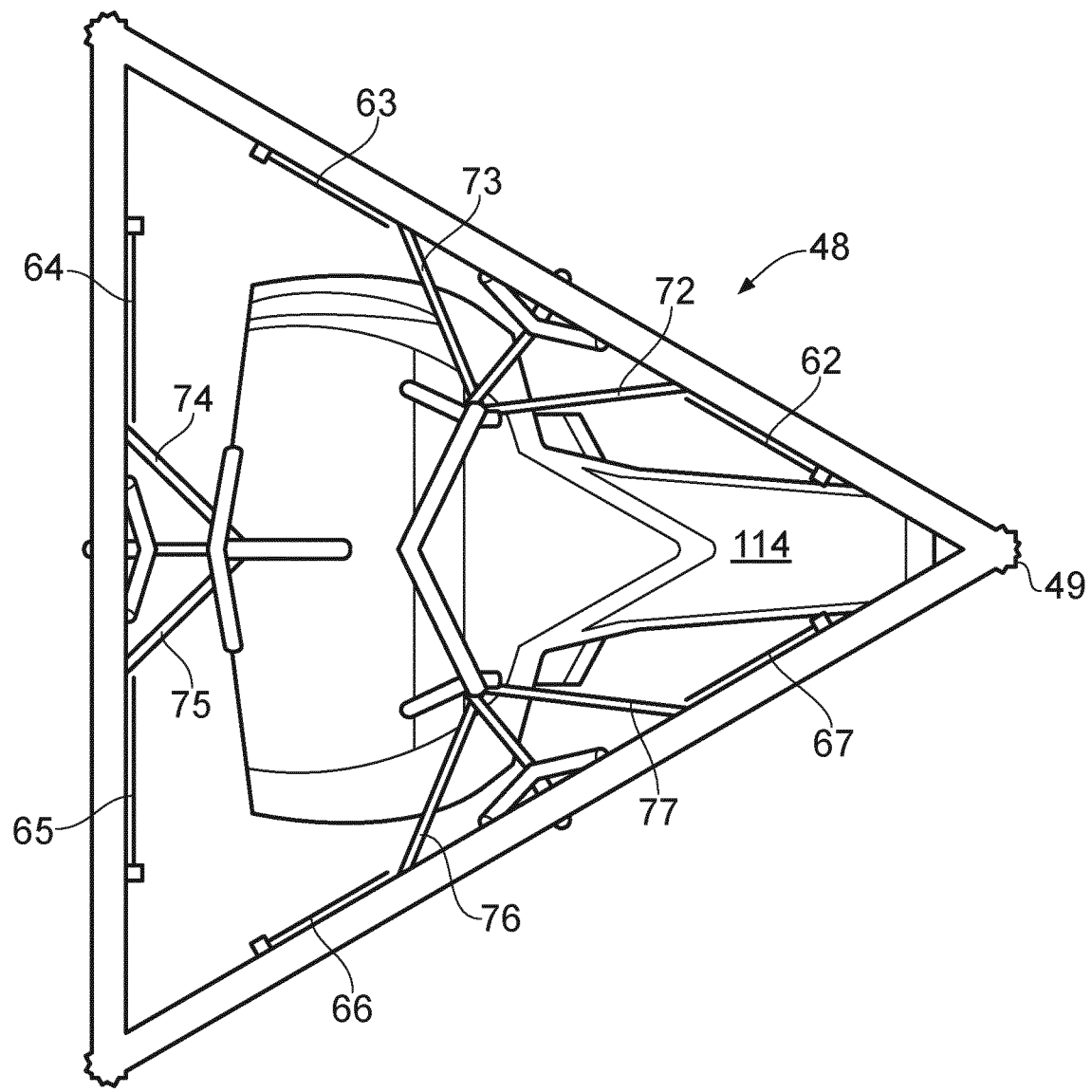
FIG. 28 is a plan view from below of the secondary motion generator shown in FIG. 14 in a pitch nose down configuration without the base.

In the pitch nose down configuration shown in FIG. 28, the position of the actuator carriages 62C, 63C, 64C, 65C, 66C, and 67C is as follows:

| | |
|---|---|
| Actuator carriage 67C position | Outward |
| Actuator carriage 66C position | Outward |
| Actuator carriage 65C position | Inward |
| Actuator carriage 64C position | Inward |
| Actuator carriage 63C position | Outward |
| Actuator carriage 62C position | Outward |

Figure 29:
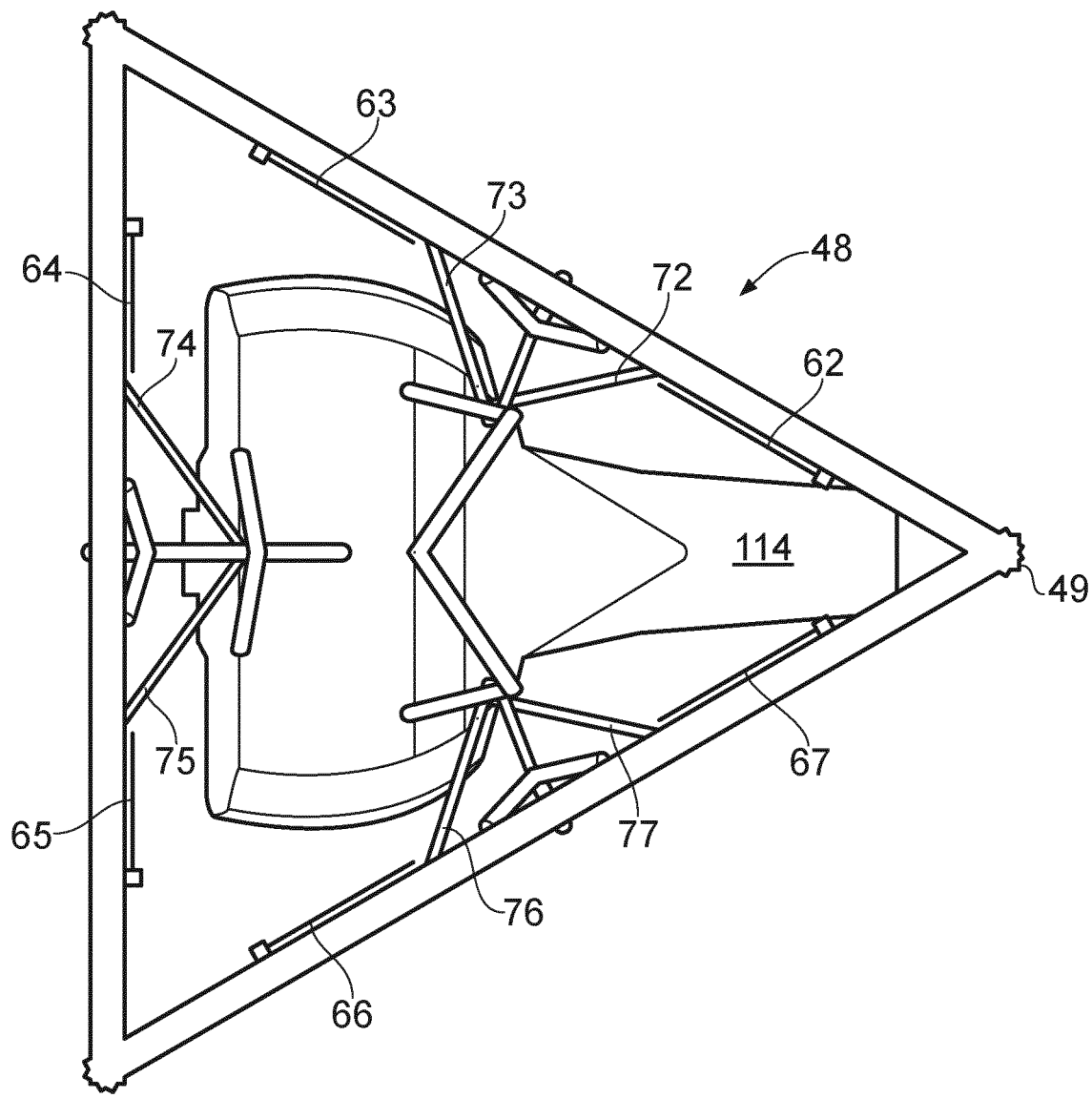
FIG. 29 is a plan view from below of the secondary motion generator shown in FIG. 14 in a pitch nose up configuration without the base.

In the pitch nose up configuration shown in FIG. 29, the position of the actuator carriages 62C, 63C, 64C, 65C, 66C, and 67C is as follows:

| | |
|---|---|
| Actuator carriage 67C position | Inward |
| Actuator carriage 66C position | Inward |
| Actuator carriage 65C position | Outward |
| Actuator carriage 64C position | Outward |
| Actuator carriage 63C position | Inward |
| Actuator carriage 62C position | Inward |

Figure 30:
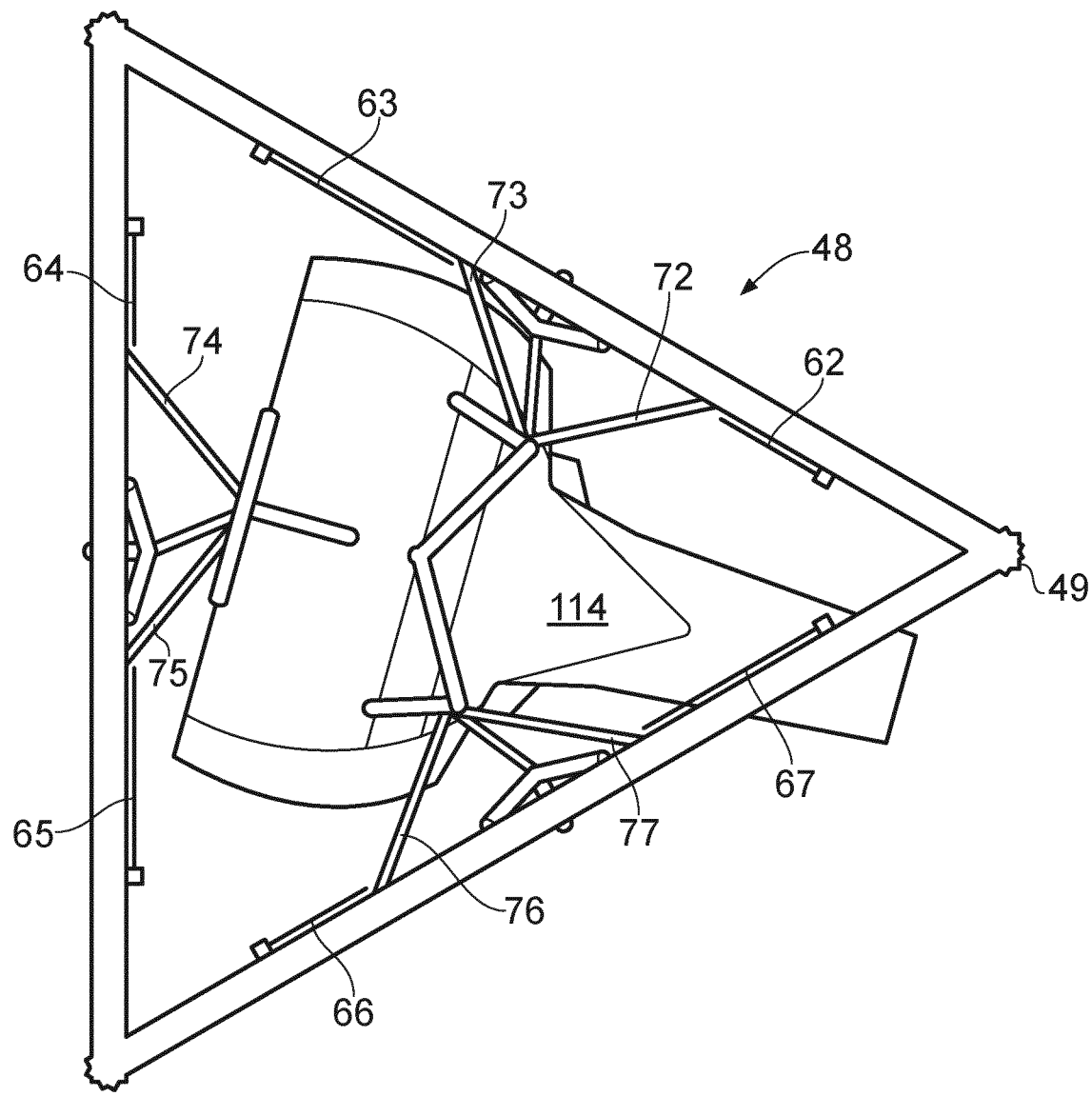
FIG. 30 is a plan view from below of the secondary motion generator shown in FIG. 14 in a yaw nose leftward configuration without the base.

In the yaw nose leftward condition shown in FIG. 30, the position of the actuator carriages 62C, 63C, 64C, 65C, 66C, and 67C is as follows:

| | |
|---|---|
| Actuator carriage 67C position | Inward |
| Actuator carriage 66C position | Outward |
| Actuator carriage 65C position | Inward |
| Actuator carriage 64C position | Outward |
| Actuator carriage 63C position | Inward |
| Actuator carriage 62C position | Outward |

Figure 31:
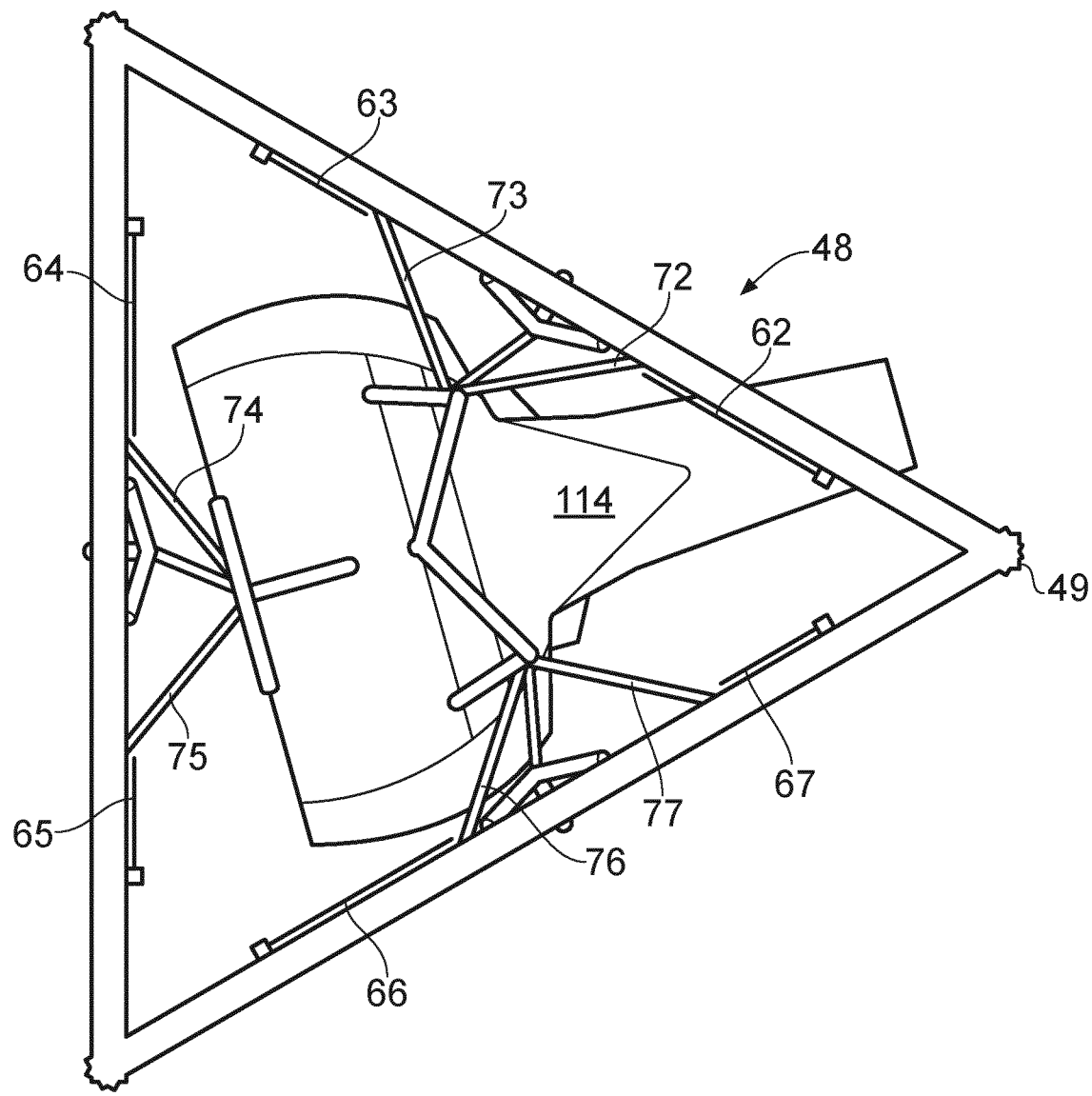
FIG. 31 is a plan view from below of the secondary motion generator shown in FIG. 14 in a yaw nose rightward configuration without the base.

In the yaw nose rightward condition shown in FIG. 31, the position of the actuator carriages 62C, 63C, 64C, 65C, 66C, and 67C is as follows

| | |
|---|---|
| Actuator carriage 67C position | Outward |
| Actuator carriage 66C position | Inward |
| Actuator carriage 65C position | Outward |

| | |
|---|---|
| Actuator carriage 64C position | Inward |
| Actuator carriage 63C position | Outward |
| Actuator carriage 62C position | Inward |

In practice, in a motion system of the invention, the secondary motion generator 48, sits between primary motion generator e.g. 100 and chassis e.g. 114, and when operated provides additional or alternative (i.e. redundant) movement to that generated by the primary motion generator 100 and applied to the chassis 114.

In FIG. 32 to FIG. 35 there are shown motion systems comprising a primary motion generator in accordance with the invention and different secondary motion generator configurations.

Figure 32:
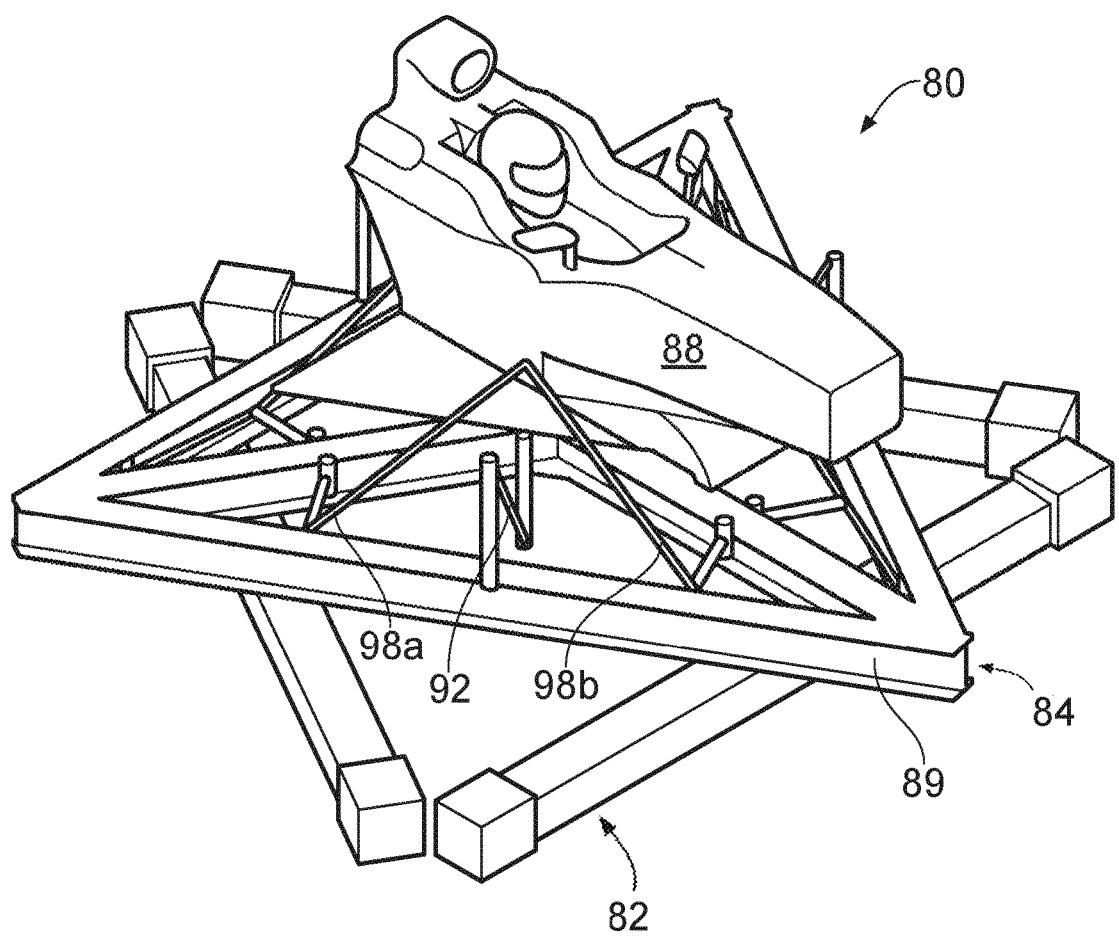
FIG. 32 shows in perspective from above and one side another motion system in accordance with the invention comprising a primary motion generator and a secondary motion generator.
Figure 33:
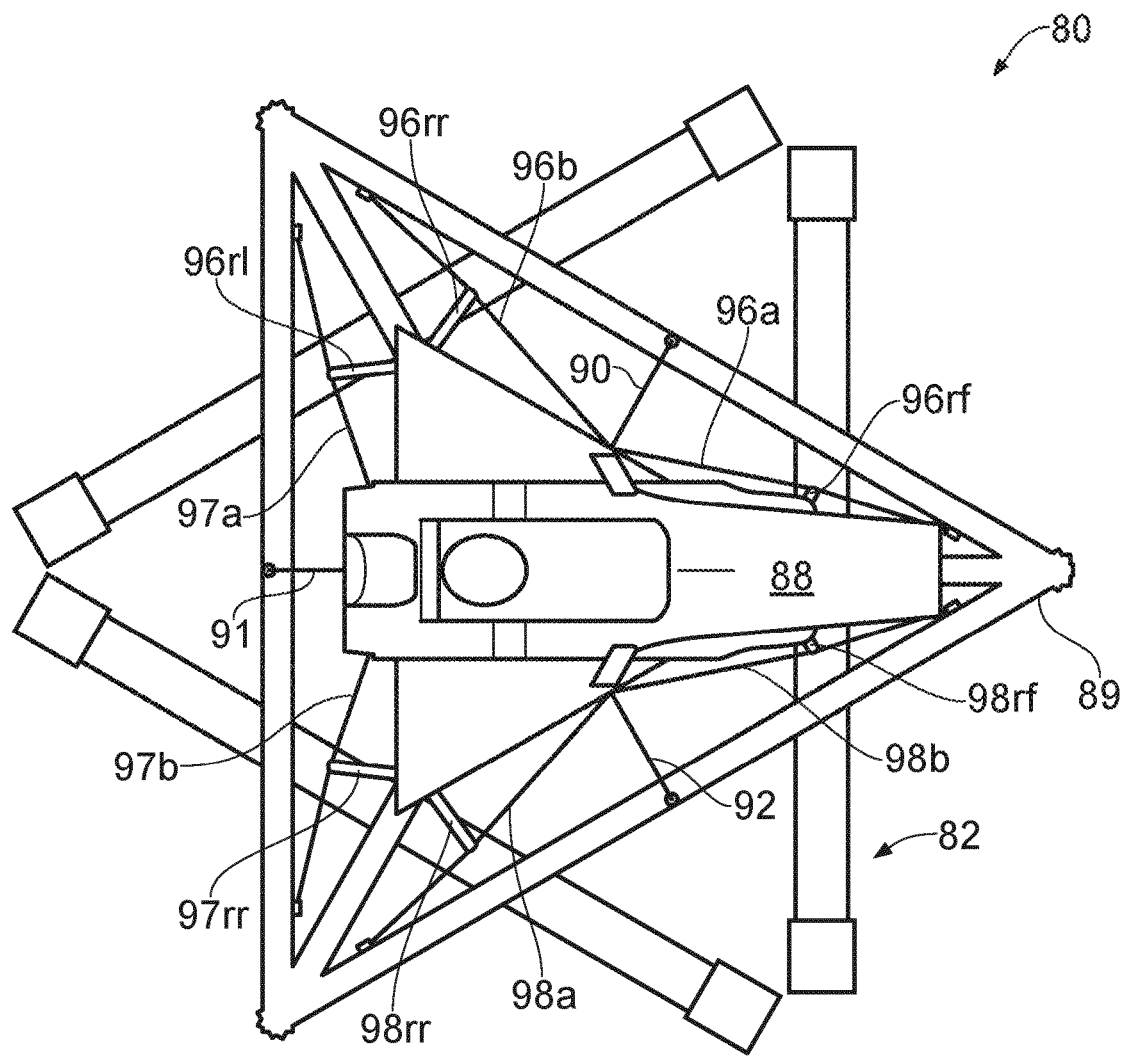
FIG. 33 shows the motion system of FIG. 32 in plan view.
Figure 34:
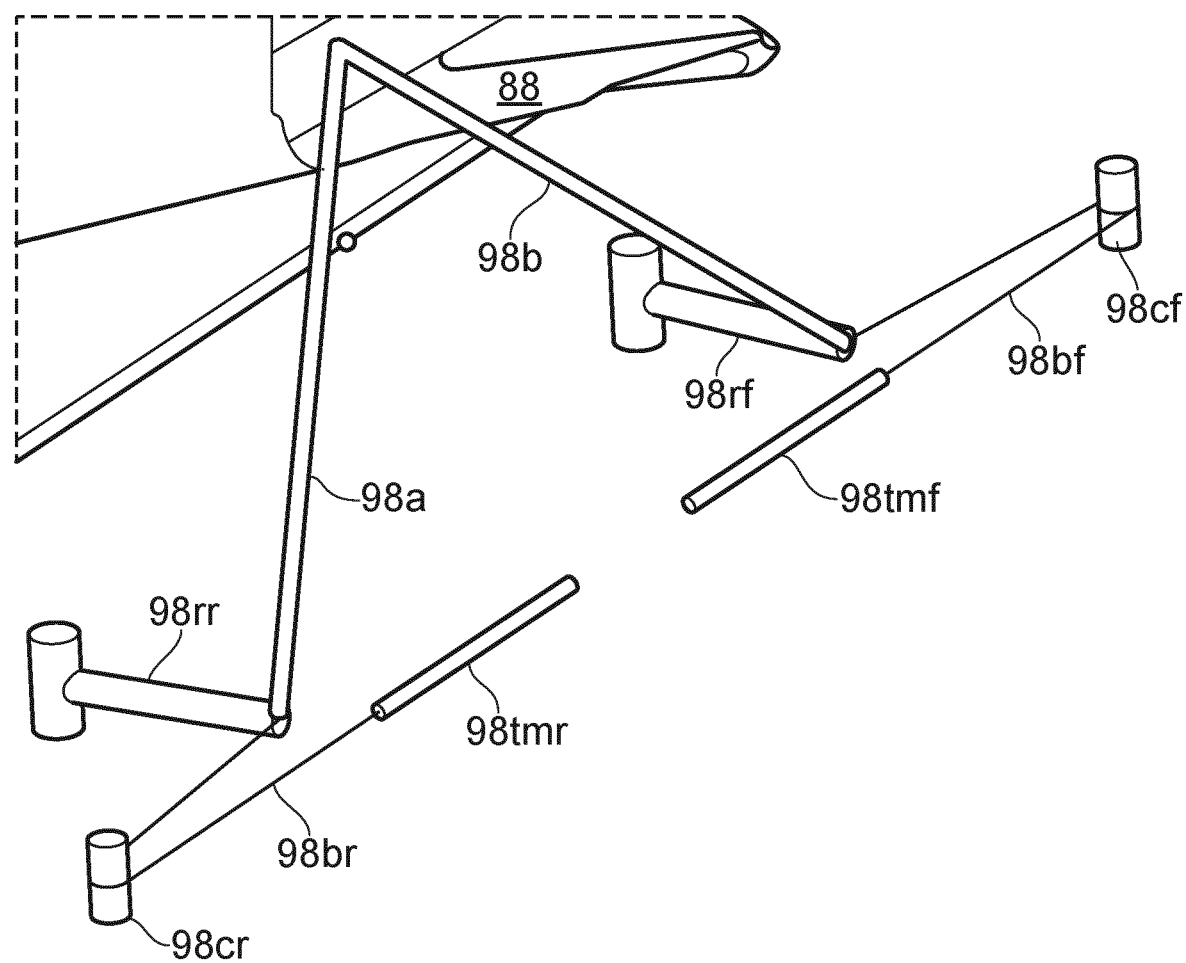
FIG. 34 is a detailed schematic view of a portion of the secondary motion generator in the motion system of FIG. 32.

Primary Motion Generator and 6 DOF Secondary Motion Generator-Based Motion System A motion system 80 in accordance with the invention, comprising a primary motion generator 82 in accordance with the first aspect of the invention, and a 6 DOF secondary motion generator 84, is shown in FIG. 32 to 34. The motion system 80 sits on a surface 86.

The primary motion generator 82 is as described above for example in FIG. 1, save that the secondary motion generator 84 and chassis 88 replace the chassis 14 as the payload of the primary motion generator.

The chassis 88 is suspended from a triangular support frame 89 by elongate elastic members 90, 91, 92. Pairs of elongate tensile members or struts, 96a, 96b; 97a, 97b and 98a, 98b, each of which is connected at one end to the chassis 88, are connected at their other end to outwardly-facing rockers 96rf,96rr; 97rl,97rr; and 98rr,98rf respectively. This arrangement is shown in more detail in FIG. 34. As seen in FIG. 34, the rockers on the right side of the secondary motion generator, 98rr and 98rf are free to pivot in a horizontal plane, and in turn are also connected by toothed belts 98br and 98bf which engage correspondingly-toothed capstans, 98cr and 98cf, of actuators arranged along the inside of the frame 89 (omitted from FIG. 34 for clarity). Each belt, 98br, 98 bf, which is connected at one end to an elongate tensile member 98a and 98b respectively, runs around a capstan 98cr and 98cf respectively and then connects to a passive tension member, 98tmr and 98tmf respectively such as a spring or bungee, or similar passive tension element, fast with the support frame (omitted for clarity). Similar pairs of elongate tensile members, rockers, toothed belts, toothed capstans and passive tension members are provided on the other sides of the triangular frame 89 and operate in a corresponding manner.

The rotational position of the capstans (e.g. 98cr and 98cf) of the actuators is under the command of a control system (as shown for example in FIG. 37). Accordingly, movement of the actuator capstans (e.g. 98cr and 98cf) drives movement of the belt (e.g., 98br, 98bf) against or in favour of tension applied by the passive tension member (e.g. 98tmr, 98tmf) to alter the position of a connected rocker (98rr, 98rt) and in turn the position of an elongate tensile member (e.g. 98a, 98b) connected to the rocker (98rr, 98rf) which leads to movement of the chassis 88 in six degrees of freedom. High bandwidths may be achieved with this secondary motion generator design. Furthermore, advanced movements/configurations can be obtained through the combination of advanced primary and secondary motion generators.

The primary motion generator 82 can generate large amplitude displacements but with a more limited bandwidth, whereas the secondary motion generator 84 can only generate small amplitude displacements but it has a much higher bandwidth. This series configuration facilitates a combination of large amplitude and high frequency movements in the following manner. In the case of high frequency movements, the secondary motion generator 84 will apply the required accelerating forces to the payload and react these against the inertia of the primary motion generator, thereby propelling the payload in the desired direction while reacting against the primary motion generator 82 and indeed pushing it the opposing direction. Therefore, the reaction force from the secondary motion generator 84 to the primary motion generator 82 will actually drive the primary motion generator 82 backwards in the opposing direction to that in which the payload 88 was moved. This is entirely acceptable for the high frequency movements. For low frequency movements, the secondary motion generator 84 will impart a driving force on the payload 88 while the primary motion generator 82 will simultaneously impart an accelerating force on the secondary motion generator 84 to react the reaction force from the payload 88 and secondary motion generator 88 all the way to the ground. In this case, the relative movement of the secondary motion generator 84 with respect to the payload 88 is very small and instead the primary motion generator 82 may be driven in a movement profile (i.e. a series of movements performed by the motion generator over a period of time) very similar to the horizontal movements demanded of the payload.

Figure 35:
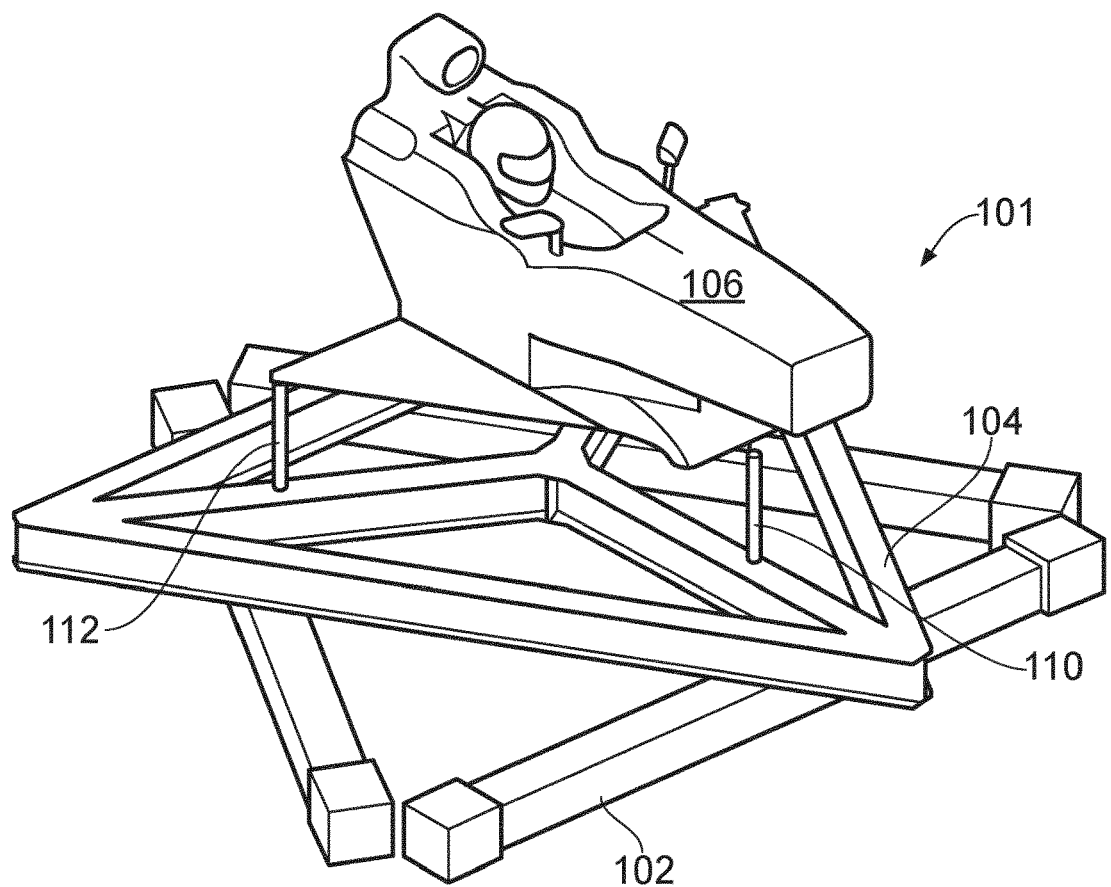
FIG. 35 shows another motion system in accordance with the invention in1 perspective from above and one side comprising a primary motion generator and a different secondary motion generator.

Primary Motion Generator and 3 DOF Secondary Motion Generator-Based Motion System Another motion system 101 in accordance with the invention is shown in FIG. 35. The motion system comprises a primary motion generator 102 in accordance with the first aspect of the invention, for example as described above in relation to FIG. 1, and a relatively simple 3 DOF motion generator 104, for supporting a payload such as a chassis 106, in which motion is provided by vertical actuators 1 10,1 12,1 14 (obscured). For example, the vertical actuators 1 10, 1 12, 1 14 may be D-box-type actuators Other types of actuators such as hydraulic jacks or linear actuators are also contemplated. The secondary motion generator 104, which together with any chassis (e.g. 106) mounted thereon becomes the payload of the primary motion generator, and is only capable of movement in three degrees of freedom but may be relatively low cost (as it is relatively simple) compared to other secondary motion generators contemplated for use in motion systems of the invention. A constraint system (not shown) is required to maintain the chassis position relative to the primary frame in the three horizontal degrees of freedom that are not controlled by the 3 DOF system.

Control System

FIG. 37 shows a control system 501 for use in controlling operation of a motion generator in accordance with the invention. In relation to FIG. 37 the motion generator is referred to as 502, but the control system 501 is applicable to the other motion generators, motion systems, and motion simulators described herein) and a related simulation environment 503.

The control system 501 comprises a motion controller 504 which executes a computer program, preferably in a deterministic or real time manner, which takes motion demand inputs 505 from a demand generator such as the simulation environment 503 or a set point generator 506. The motion controller computes the positions, accelerations and/or forces 507 required to be produced at each actuator 509 to in order to generate the demanded motion profile 505. The control system 501 also comprises servo drives 508 which provide precisely controlled electrical currents 510 to drive the actuators 509.

In operation, the motion controller sends to each servo drive 508 a demanded position or force 507. The actuator 509 has a motion measurement device 511, such as an encoder, which provides motion feedback 512 to the motion controller, optionally via the servo drive. The motion controller compares the demanded motion profile 505 to the one measured 512 and updates the actuator demand 507 accordingly.

FIG. 37 also shows the control system with a simulation environment 503, such as a driving simulation in which the physics of a simulated vehicle and its environment, such as a racetrack or city roads, are computed. In this embodiment the control system 501 receives motion demands from the simulation environment 503, which represents the motion of a virtual vehicle. The computer program determines the motion of the vehicle in a virtual world 514, then applies a motion cueing algorithm 513 (MCA, also known as washout filters) to transform the simulated vehicle motions into those that can be represented by the motion generator. These calculated motions are then provided to the control system as motion demands 505. The MCA 513 could be part of the simulation environment 503 or the control system 501 or separate to both. The simulation environment 503 may receive inputs signals 515 from control devices 516 such as steering, throttle or brake inputs, which an operator, i.e. a human user such as a driver, passenger or pilot uses to control the virtual vehicle in the simulation environment. The operator would likely be a passenger on the motion generator 502. These inputs 515 may be passed back to the simulation environment via the control system or directly. The simulation environment is also likely to produce an output on a visual display 517 for the driver, passenger, or other user or operator. The simulation environment may also require additional data 518 from the control system, such as relating to the position of the motion generator, or control device inputs signals.

Driving Simulator

Figure 36:
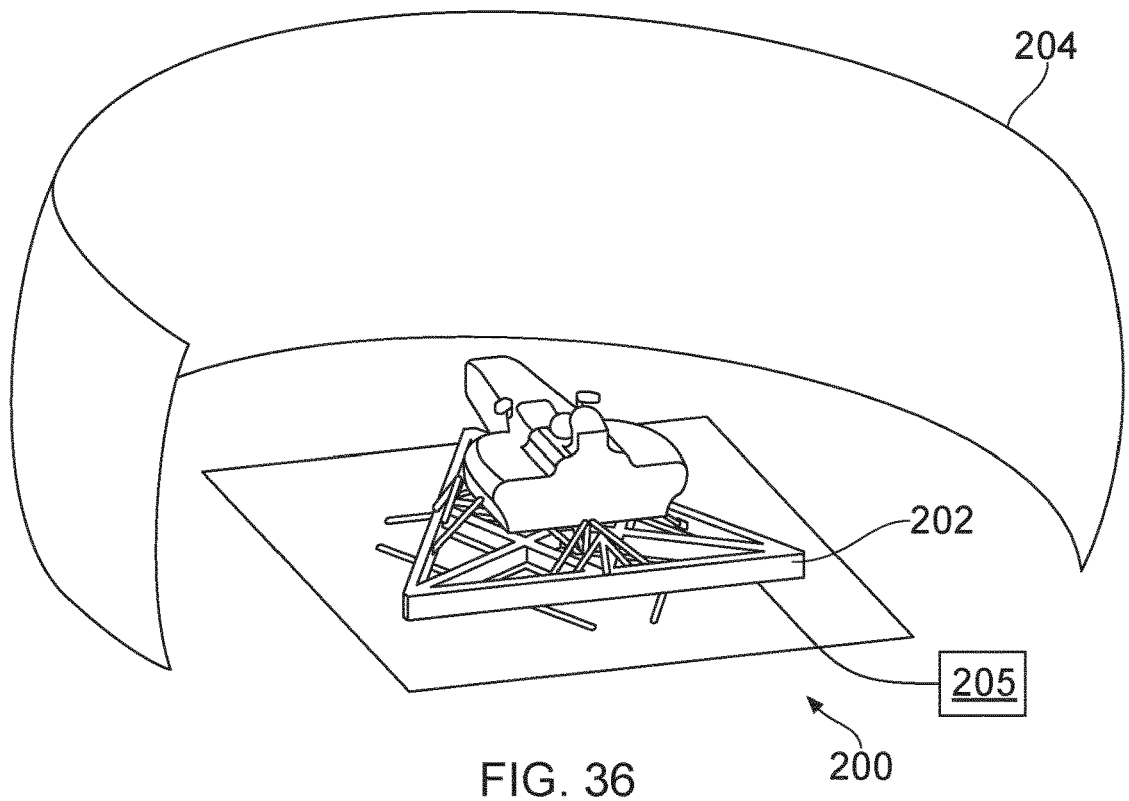
FIG. 36 is a perspective view of a driving simulator incorporating a motion system in accordance with the invention.

A driving simulator 200 incorporating a motion system 202 comprising the combination of a primary motion generator and a secondary motion generator in accordance with the invention is shown in FIG. 36. The motion system 202, which is under the control of a control system 205 (which is for example as shown in FIG. 37) to replicate motion, faces a projection system 204 on which a driving environment is simulated. An additional sound system (also not shown) provides a user (i.e. a "driver") with an immersive experience. The driver interacts with the simulated driving environment by means of an actuated steer system which measures the driver's steering input angle and provides torque feedback to the wheel by means of a steering actuation system or steering motor. Additionally, the driver may provide inputs to the simulated driving environment by means of pedals for the control of the vehicle within the simulation, and other switches, rotary knobs and touch-screen devices. A computer program representing the vehicle model, which encapsulates the physics of a real vehicle, will also form part of the simulation and interacts with the control system.

Production of Motion Generators, Motion Systems and Driving Simulators

Motion generators, and motion systems, in accordance with the invention may be assembled from a combination of custom and standard components by conventional methods to produce the novel motion generators, and motion systems of the invention. Control means suitable for controlling operation of motion generators, and motion systems, in accordance with the invention may similarly be produced by conventional methods.

The invention claimed is:

1. A primary motion generator (10,82,102) for use in a motion simulator for moving a primary payload (14) of 80 kg or more above a surface (12), the primary motion generator (10,82,102) being a parallel manipulator comprising:
 a primary frame or platform (11) for supporting the primary payload of 80 kg or more (14), the primary frame or platform (11) including three elongate linear guides (21,22,23) arranged transversely to each other at and along an underside or surface of the primary frame or platform (11) in a planar array, and
 at least one actuator (31,32,33) arranged per linear guide (21,22,23) above the surface, and controllable to collectively move the primary frame or platform (11) and the linear guides (21,22,23), whereby the primary frame or platform (11) and payload of 80 kg or more is movable in at least three degrees of freedom.

2. The primary motion generator (10,82,102) according to claim 1, in which projections of the elongate linear guides (21,22,23) converge.

3. The primary motion generator (10,82,102) according to claim 2, in which the elongate linear guides (21,22,23) form a star-shaped array, extending outwardly from a common central point on the primary frame or platform (11).

4. The primary motion generator (10,82,102) according to claim 3, in which either at least two of the elongate linear guides are joined with each other or three of the elongate linear guides are joined with each other.

5. The primary motion generator (10,82,102) according to claim 1, in which there are six actuators (31,32,33).

6. The primary motion generator (10,82,102) according to claim 1, in which the actuators (31,32,33) are linear actuators, selected from linear motors, rack and pinion-based actuators, belt-driven actuators, or cable-driven actuators.

7. The primary motion generator (10,82,102) according to claim 6, in which the linear actuators (31,32,33) move the primary frame or platform (11) by applying propulsive forces to carriages (41,42,43) that connect the linear actuators (31,32,33) to the linear guides (21,22,23) and are movable along the linear guides (21,22,23), the propulsive forces thereby being transmitted from the actuators to the primary frame or platform (11) via the carriages (41,42,43) and linear guides (21,22,23) by applying forces which include a component that is normal/perpendicular to the axis of movement of the linear guide, in such a way that forces applied at one linear guide are transmitted through the primary frame or platform (11) and cause other linear guides to travel along their axis of movement.

8. The primary motion generator according to claim 7, in which each linear actuator (31,32,33) is connected to a corresponding linear guide's carriage by a joint, bearing, revolute joint, spherical joint or thrust bearing.

9. The primary motion generator (10,82,102) according to claim 1, including at least one safety end stop to limit travel of the primary frame or platform (11) comprising one of:
 one or more elongate straps between the platform or frame (11) and the surface which limits movement of the frame or platform; or
 three or more straps between the primary frame or platform (11) and the surface which limit movement of the primary frame or platform, wherein at least one of the three or more elongate straps is rigidly fixed at one end and at the other end connected in series with a shock absorber, spring, or damper.

10. A combination comprising:
 the primary motion generator (10,82,102) according to claim 1 as the primary motion generator (10,82,102) in the combination, and
 a secondary motion generator (48, 84, 104) connected to the primary motion generator (10,82,102) as the primary motion generator's (10,82,102) payload,
 wherein, in use, the secondary motion generator (48, 84, 104) is controllable to move a secondary payload (84,88) of at least 80 kg in one or more degrees of freedom relative to the primary frame or platform (11) and therefore the surface.

11. A motion system comprising:
the combination according to claim 10; and
control means for control of the operation of the primary and secondary motion generators within the combination.

12. A motion system comprising:
at least one motion generator according to claim 1, and
control means for control of the operation of the at least one motion generator.

13. A vehicle simulator comprising:
the motion system according to claim 12, and
a cockpit or chassis and/or another vehicle simulation element.

14. A vehicle simulator comprising:
at least one motion generator according to claim 1, and
a cockpit or chassis and/or other vehicle simulation element.

15. The vehicle simulator according to claim 14, including means for simulating an environment comprising at least one of display apparatus, virtual reality apparatus, projection apparatus, and software means for modelling a virtual environment and a vehicle model.

16. A game apparatus for domestic or commercial use comprising at least one motion generator according to claim 1 and a control system configured for control of the operation of the at least one motion generator.

17. A method of producing the primary motion generator according to claim 1, the method comprising:
providing a primary frame or platform (11),
arranging at least three elongate linear guides transversely to each other at and along an underside or surface of the primary frame or platform (11), and
providing at least one linear actuator per elongate linear guide and arranging the linear actuators transversely per elongate linear guide to produce the primary motion generator (10,82,102).

18. The primary motion generator (10,82,102) according to claim 1, in which first and second ends of each elongate linear guide are disposed at respective first and second positions at the underside or surface of the primary frame or platform (11) within a periphery of the underside of the primary frame or platform.

19. The primary motion generator (10,82,102) according to claim 1, in which each of the three elongate linear guides extends along a respective axis which is perpendicular a respective corresponding axis of the corresponding at least one actuator.

20. The primary motion generator (10,82,102) according to claim 1, in which the three elongate linear guides are each disposed between the primary frame or platform and their corresponding at least one actuator, the three elongate linear guides being disposed above and spaced from their corresponding at least one actuator by carriages which connect the actuators to the respective linear guides.

* * * * *